United States Patent
Tokunaga et al.

(10) Patent No.: US 12,495,936 B2
(45) Date of Patent: Dec. 16, 2025

(54) MEMBRANE UNIT AND HAND WASHING DEVICE

(71) Applicant: WOTA CORP., Tokyo (JP)

(72) Inventors: Satoshi Tokunaga, Tokyo (JP); Ryo Yamada, Tokyo (JP); Wataru Watanabe, Tokyo (JP)

(73) Assignee: WOTA CORP., Tokyo (JP)

( * ) Notice: Subject to any disclaimer, the term of this patent is extended or adjusted under 35 U.S.C. 154(b) by 108 days.

(21) Appl. No.: 18/517,099

(22) Filed: Nov. 22, 2023

(65) Prior Publication Data

US 2024/0122413 A1 Apr. 18, 2024

Related U.S. Application Data

(63) Continuation of application No. PCT/JP2022/020505, filed on May 17, 2022.

(30) Foreign Application Priority Data

May 31, 2021 (JP) ................................. 2021-091337

(51) Int. Cl.
*A47K 1/04* (2006.01)
*A47K 1/02* (2006.01)
*C02F 1/44* (2023.01)

(52) U.S. Cl.
CPC ................ *A47K 1/04* (2013.01); *C02F 1/441* (2013.01); *A47K 1/02* (2013.01);
(Continued)

(58) Field of Classification Search
CPC .. A47K 1/04; A47K 1/02; C02F 1/441; C02F 2201/005; C02F 2303/04; C02F 2307/10;
(Continued)

(56) References Cited

U.S. PATENT DOCUMENTS

| 6,436,282 B1 | 8/2002 | Gundrum et al. |
| 2002/0108906 A1* | 8/2002 | Husain .................. B01D 61/04 210/636 |

(Continued)

FOREIGN PATENT DOCUMENTS

| JP | H08299766 A | 5/1996 |
| JP | 2004505757 A | 2/2004 |

(Continued)

OTHER PUBLICATIONS

International Search Report issue on Jul. 19, 2022, in corresponding International Patent Application No. PCT/JP2022/020505, 7 pages.

*Primary Examiner* — Lori L Baker
(74) *Attorney, Agent, or Firm* — Maier & Maier, PLLC

(57) ABSTRACT

A membrane unit includes: a cross-flow membrane filter; a cylindrical casing housing the membrane filter; a cap provided with an inflow port that allows water to flow into the casing, a first discharge port that discharges, to outside of the casing, permeated water obtained as a result of water that flows into the casing from the inflow port permeating the membrane filter, and a second discharge port that discharges, to the outside of the casing, concentrated water obtained as a result of water being concentrated as a result of the permeated water permeating the membrane filter, the cap detachably occluding the casing; and a positioning member which is fixed to the cap taking the first discharge port as a reference, and which defines a position of the membrane filter inside the casing.

10 Claims, 17 Drawing Sheets

(52) U.S. Cl.
CPC .... *C02F 2201/005* (2013.01); *C02F 2303/04* (2013.01); *C02F 2307/10* (2013.01)

(58) Field of Classification Search
CPC .... C02F 1/001; C02F 1/32; C02F 1/76; C02F 2209/02; C02F 2209/03; C02F 2209/05; C02F 2209/08; C02F 2209/10; C02F 2209/42; C02F 9/20; C02F 1/444; C02F 2209/06; C02F 2209/36; B01D 69/00; E03C 1/046; Y02A 20/131
USPC .... 4/638, 517, 619, 546, 597, 628–631, 653
See application file for complete search history.

(56) References Cited

U.S. PATENT DOCUMENTS

| | | | |
|---|---|---|---|
| 2004/0251192 A1 | 12/2004 | Fritze et al. | |
| 2007/0131614 A1* | 6/2007 | Knappe | B01D 65/08 210/636 |
| 2019/0031530 A1 | 1/2019 | Kitagawa et al. | |

FOREIGN PATENT DOCUMENTS

| | | | |
|---|---|---|---|
| JP | 2006525120 A | 11/2006 | |
| JP | 4698105 B2 | 6/2011 | |
| JP | 2016190180 A | 11/2016 | |
| JP | 6877065 B1 | 5/2021 | |
| WO | 2017155124 A1 | 9/2017 | |

* cited by examiner

PERSPECTIVE VIEW FROM ARROW B DIRECTION

MEMBRANE UNIT AND HAND WASHING DEVICE

CROSS-REFERENCE TO RELATED APPLICATIONS

This application is based upon and claims the benefit of priority from the prior Japanese Patent Applications No. 2021-091337, filed May 31, 2021, and from PCT Patent Applications No. PCT/JP2022/20505, filed May 17, 2022, the entire contents of which are incorporated herein by reference.

FIELD

Embodiments described herein relate generally to a membrane unit and a hand washing device.

BACKGROUND

Reverse osmosis membranes are known as filters which remove impurities contained in a water content to obtain highly pure water. A reverse osmosis membrane deteriorates as impurities adhere to its surface over the course of its usage period, and therefore it is necessary to periodically replace the reverse osmosis membrane.

When replacing a reverse osmosis membrane, it is common practice for the reverse osmosis membrane to be replaced together with a housing element in which the reverse osmosis membrane is housed.

The housing element in which the reverse osmosis membrane is housed is to be discarded along with the spent reverse osmosis membrane. It is the reverse osmosis membrane that is no longer needed, and a casing itself of the housing element is still usable.

An object of the present disclosure is to provide a membrane unit that enables reuse of a housing element.

DETAILED DESCRIPTION

Figure 1:
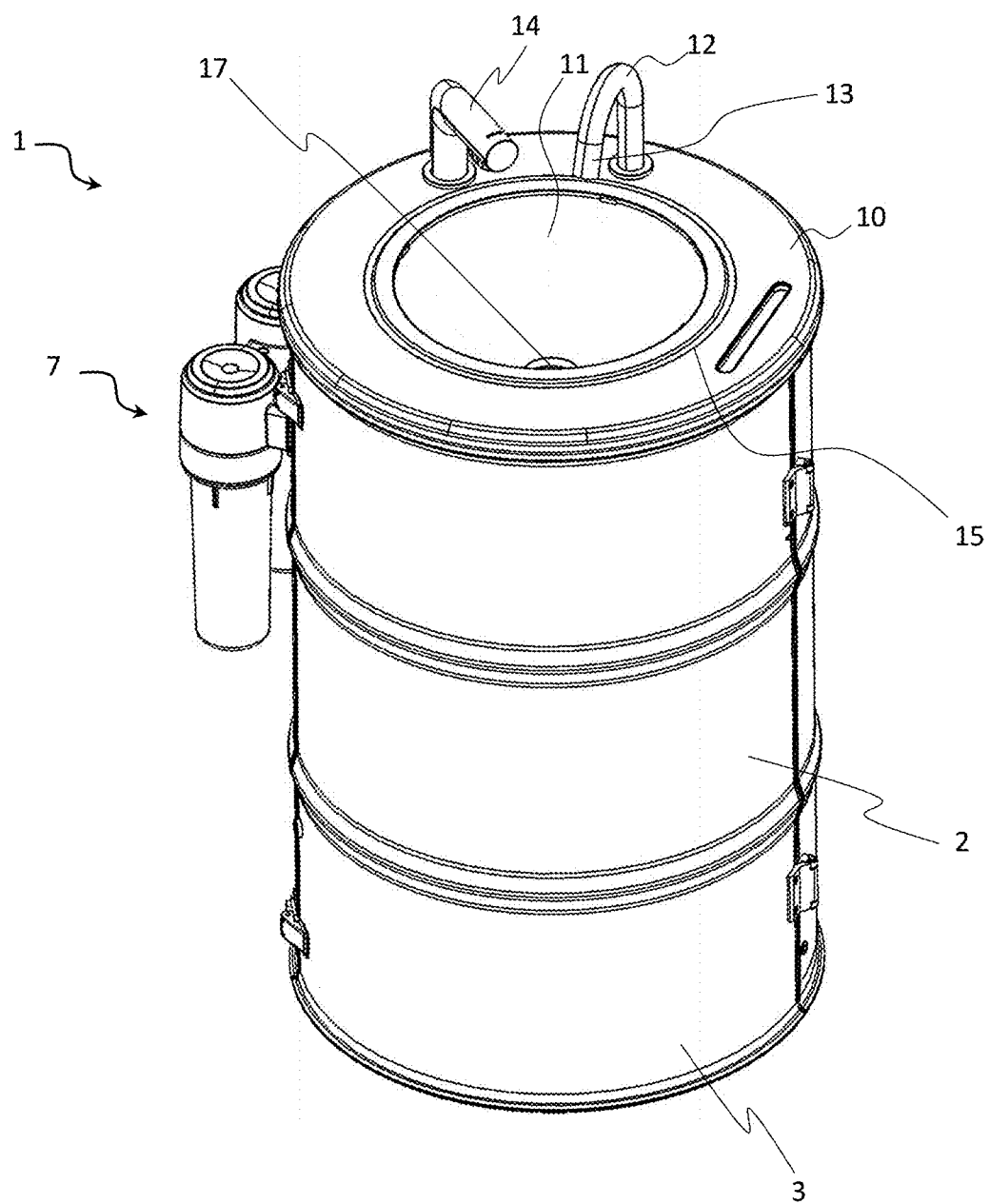
FIG. 1 is an external perspective view of a hand washing device in which a membrane unit is mounted.

In general, according to one embodiment, a membrane unit includes: a cross-flow membrane filter; a cylindrical casing that houses the membrane filter; a cap provided with an inflow port that allows water to flow into the casing, a first discharge port that discharges, to outside of the casing, permeated water obtained as a result of water that flows into the casing from the inflow port permeating the membrane filter, and a second discharge port that discharges, to the outside of the casing, concentrated water obtained as a result of water being concentrated as a result of the permeated water permeating the membrane filter, the cap detachably occluding the casing; and a positioning member which is fixed to the cap taking the first discharge port as a reference, and which defines a position of the membrane filter inside the casing.

Hereunder, one embodiment of the present disclosure will be described in detail based on the accompanying drawings. Note that, in the drawings for describing the embodiment, in principle, the same reference symbols are assigned to the same constituent elements, and repeated description thereof is omitted.

Overview

A hand washing device 1 according to the present embodiment purifies and circulates drained water after washing hands, to thereby realize hygienic hand washing without receiving a supply of water from a mains water supply. A membrane unit 80 according to the present embodiment houses a cross-flow membrane filter, and is used as a part of a circulation unit of this type of hand washing device 1.

The term "cross-flow membrane filter" refers to a membrane filter which performs filtration while suppressing the occurrence of a situation in which suspended solids and colloids in discharged water supplied to the membrane build-up on the membrane surface, by creating a flow parallel to the membrane surface. In other words, the term "cross-flow membrane filter" refers to a membrane that performs filtration by pressure-feeding discharged water at a higher pressure than an osmotic pressure of the membrane.

In the present embodiment, a reverse osmosis membrane (RO membrane) is described as an example of such a cross-flow membrane filter. Note that, as other kinds of cross-flow membrane filters, a nano-filtration membrane (NF membrane), an ultrafiltration membrane (UF membrane), a microfiltration membrane (MF membrane) and the like may be adopted.

The membrane unit 80 separates drained water used in the hand washing device 1 into concentrated water and permeated water using a reverse osmosis membrane. The permeation performance of the reverse osmosis membrane deteriorates due to various factors after being used for a predetermined period of time. Among components of the membrane unit 80, some units (replacement unit 80B) that house the reverse osmosis membrane is detachable, and is detached from the membrane unit 80 at a timing for replacing the reverse osmosis membrane, and is replaced with a new replacement unit 80B.

The replacement unit 80B can be opened and closed, and the reverse osmosis membrane that is housed therein can be taken out. The manufacturer of the replacement unit 80B collects the detached replacement unit 80B, and replaces the reverse osmosis membrane of the replacement unit 80B collected with a new reverse osmosis membrane. The manufacture delivers a new replacement unit 80B in which the reverse osmosis membrane has been replaced to a person who manages the hand washing device 1 at a place where the hand washing device 1 is installed.

In the following description, first, a configuration of the hand washing device 1 will be described, and thereafter a configuration of the membrane unit will be described in detail.

<Overall Configuration>

The overall configuration of the hand washing device 1 according to the present embodiment will now be described.

The hand washing device 1 can be installed at various places such as at an indoor location or an outdoor location. As an indoor location, for example, the hand washing device 1 is installed near an entrance of a building, in office space that a business person occupies in a building, near an entrance of a store, or the like. For example, in a case where a building is a facility used for lodging, exercise, entertainment, or the like, and it is required to check-in in order to utilize the facility, the hand washing device 1 is installed at a place where people check-in. For example, it is assumed that users wash their hands using the hand washing device 1 before or after writing in predetermined matters with a shared writing implement in order to check-in.

The hand washing device 1 has a function of sterilizing articles carried by users who wash their hands. Examples of articles that the hand washing device 1 sterilizes that may be mentioned include smartphones, tablet terminals, and the like. Note that, the hand washing device 1 may sterilize articles other than these. The sterilization of articles by the hand washing device 1 is performed simultaneously with the action of washing hands when, for example, a person who visits a restaurant washes their hands when entering the restaurant or the like.

Figure 2:
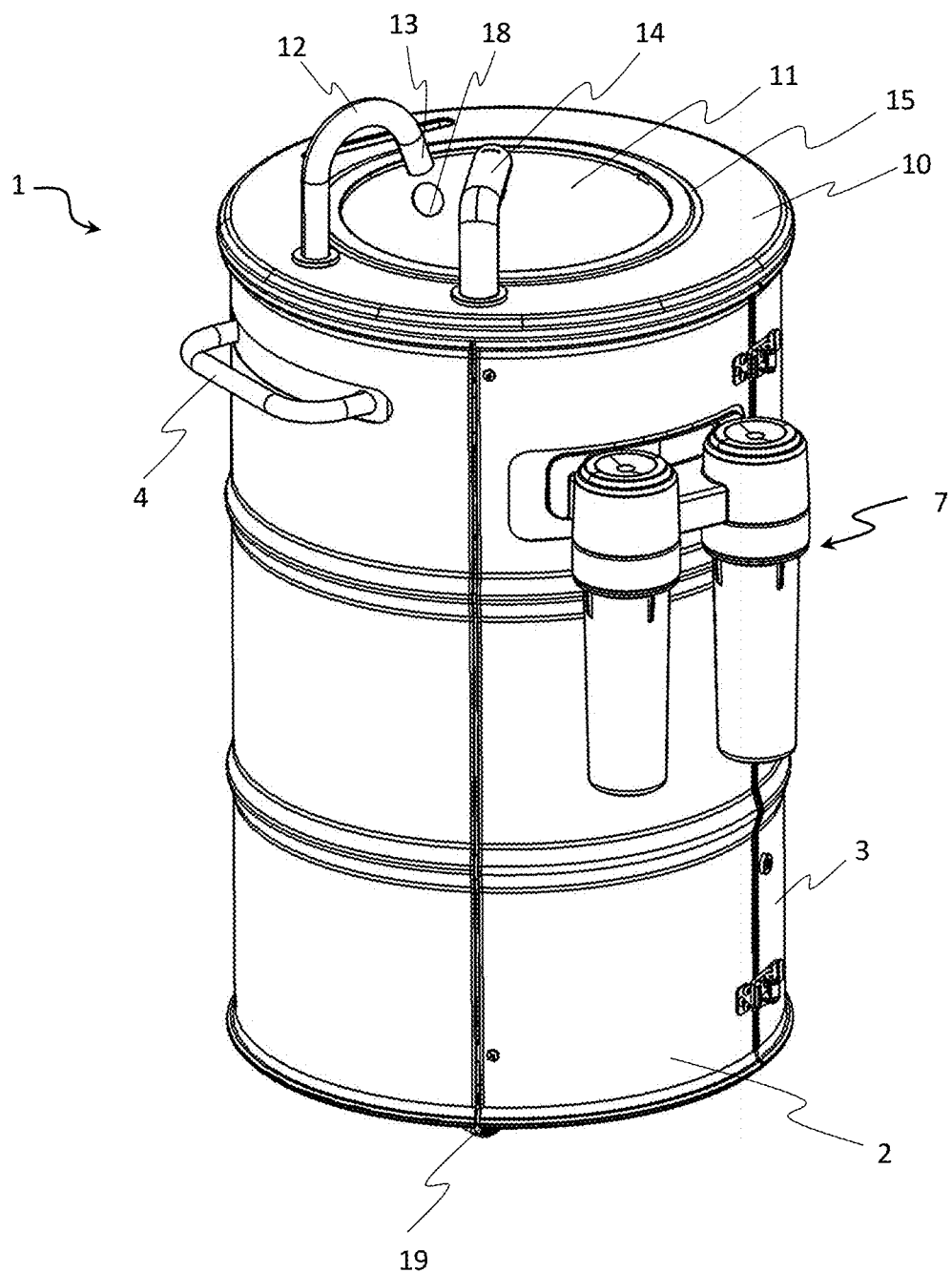
FIG. 2 is an external perspective view from the rear of the hand washing device illustrated in FIG. 1.
Figure 3:
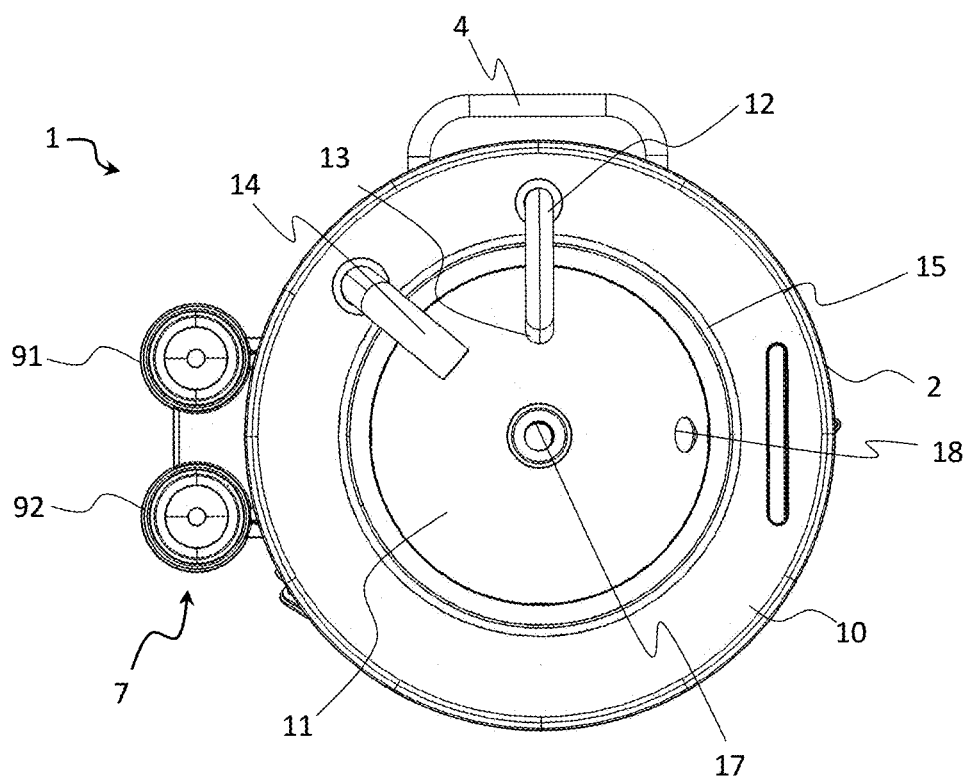
FIG. 3 is a top view of the hand washing device illustrated in FIG. 1.

FIG. 1 and FIG. 2 are external perspective views of the hand washing device 1 of the present embodiment. FIG. 3 is a top view of the hand washing device 1. Note that, in the following description, a side on which a user who uses the hand washing device 1 stands is referred to as the front of the hand washing device 1, and an opposite side thereto is referred to as the rear of the hand washing device.

As illustrated in FIG. 1, the hand washing device 1 includes a casing 2, and an externally attached module 7.

A wash-hand basin 11, a faucet 12, and a dispenser 14 are provided in the casing 2.

<Configuration of Casing 2>

The casing 2 is formed in a cylindrical shape. The casing 2 is made by, for example, processing a drum can. A top plate 10 is provided at an upper part of the casing 2. An installation hole that penetrates the top plate 10 is formed in a central part of the top plate 10.

A door 3 for accessing a circulation unit 6 provided inside the casing 2 is provided in an outer peripheral surface of the casing 2. A manager of the hand washing device 1 can perform maintenance of the circulation unit 6 in a state in which the door 3 is open.

An entire structure of the circulation unit 6 is not provided inside the casing 2, and at least one part of the circulation unit 6 is arranged outside the casing 2 as a part of the externally attached module 7.

As illustrated in FIG. 2, a handle 4 extending in a lateral direction is provided on the rear of the casing 2.

A plurality of wheels 19 are provided on a bottom surface of the casing 2. The user can move the casing 2 by moving the wheels 19 in a state in which the user grips the handle 4.

As illustrated in FIG. 3, the wash-hand basin 11 is provided in one part of the casing 2, and has a circular bowl shape in top view. In the illustrated example, the wash-hand basin 11 is arranged by being fitted into the installation hole in the top plate 10 provided in the casing 2.

A drainage outlet 17 for draining washing water spouted into the basin is formed in a bottom of the wash-hand basin 11.

An overflow hole 18 is formed in an inner peripheral surface of the wash-hand basin 11 to prevent washing water overflowing onto the top plate 10 by draining the washing water when a level of washing water in the basin exceeds a predetermined water level.

A spout 13 for spouting washing water is formed at a tip of the faucet 12. An infrared sensor 23 (see FIG. 4) is provided in the faucet 12.

The infrared sensor 23 is provided alongside the spout 13 at the tip of the faucet 12. When an object is detected by the infrared sensor 23, washing water is spouted from the spout 13 of the faucet 12.

Note that, a position at which the infrared sensor 23 is provided in the faucet 12 is not limited to the tip, and can be changed arbitrarily.

As illustrated in FIG. 1, a base of the faucet 12 is attached to the top plate 10. The faucet 12 is constructed so as to extend upward from the base towards the tip, and is curved at a central part so that the spout 13 that is located at the tip faces downward.

The dispenser 14 dispenses a pharmaceutical agent for maintaining skin hygiene from a nozzle toward the inside of the wash-hand basin 11. Examples of pharmaceutical agents for maintaining skin hygiene include cleansing agents for cleaning the skin (for example, a cleanser such as soapy water), and liquids or hand lotions or the like having a bactericidal action (for example, a disinfectant containing an ingredient such as alcohol).

An infrared sensor 52 (see FIG. 4) is provided in the dispenser 14. The infrared sensor 52 is provided, for example, in the vicinity of a base of the nozzle of the dispenser 14 so as to be capable of detecting a finger that approaches the inside of the wash-hand basin 11.

When an object is detected by the infrared sensor 52, the pharmaceutical agent is dispensed from the tip of the nozzle of the dispenser 14.

As illustrated in FIG. 1, a hand-washing indicator 15 that is an indicator light showing a rough estimate of a hand-washing time period of the user is provided on an upper face of the casing 2. The hand-washing indicator 15 is arranged on an upper face of the top plate 10 of the casing 2.

The hand-washing indicator 15 is arranged outside the wash-hand basin 11 on the upper face of the top plate 10, and is formed so as to surround the wash-hand basin 11 at an upper edge of the wash-hand basin 11.

The hand-washing indicator 15 is composed of, for example, a plurality of LED lights. The plurality of LED lights are arranged, for example, at intervals in a circumferential direction at the upper edge of the wash-hand basin 11.

In the present embodiment the hand-washing indicator 15 is composed of 30 LED lights.

<Configuration of Pharmaceutical Agent Unit 5 and Circulation Unit 6>

Figure 4:
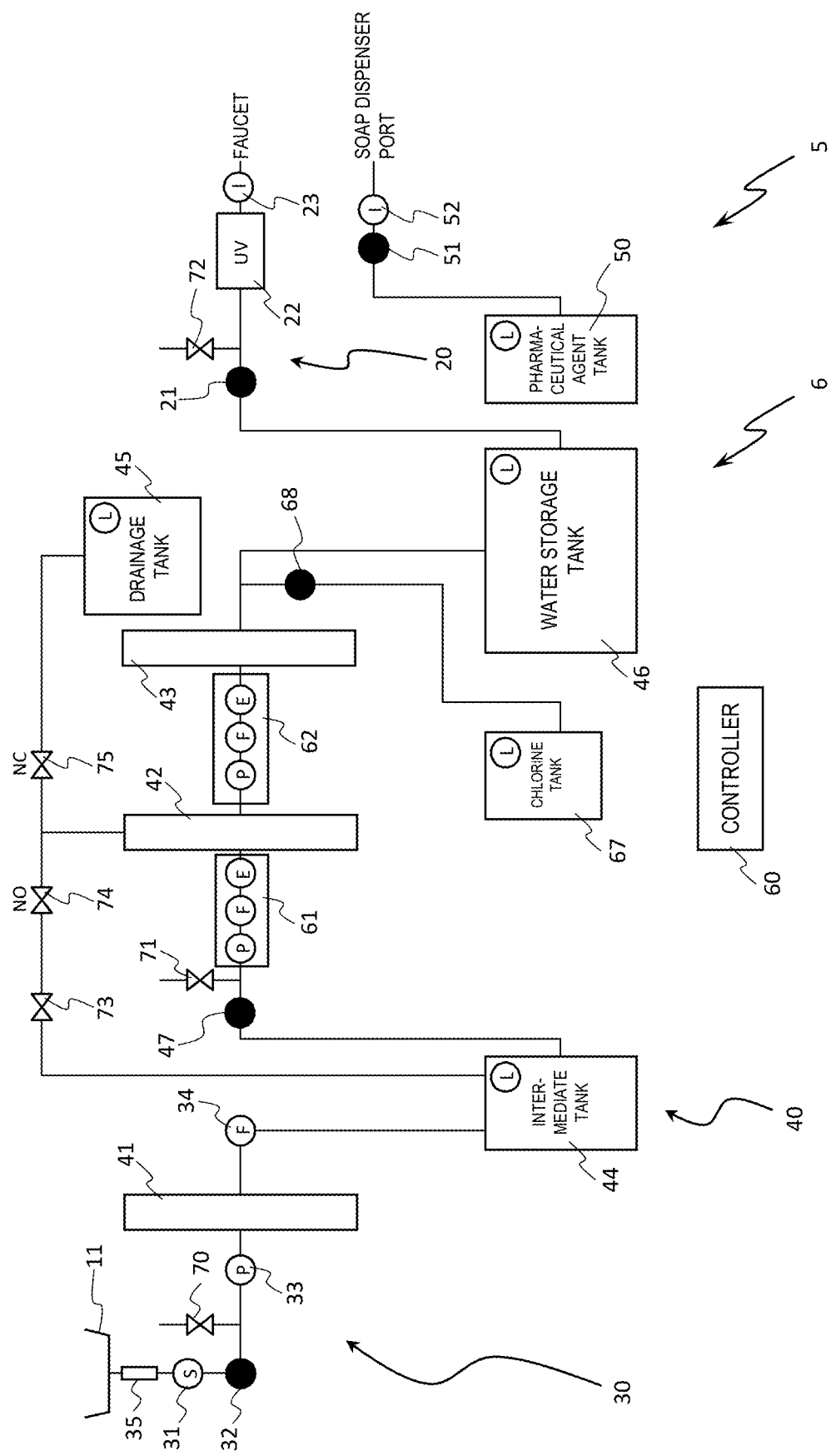
FIG. 4 is a block diagram illustrating a hand washing unit shown in FIG. 1.

FIG. 4 is a block diagram illustrating a pharmaceutical agent unit 5, the circulation unit 6, and a controller 60 of a hand washing unit 1A.

The pharmaceutical agent unit 5 that supplies a pharmaceutical agent, the circulation unit 6 that purifies and circulates washing water, and the controller 60 that controls the circulation unit 6 are provided inside the casing 2.

The controller 60 is realized by a processor reading out a program stored in a storage and expanding the program on a memory, and executing commands included in the expanded program. The processor is hardware for executing a set of commands described in a program, and is composed of an arithmetic unit, a register, a peripheral circuit, and the like. The storage is a storage device for storing data, such as a flash memory or a HDD (hard disc drive). The memory is for temporarily storing programs and also data to be processed by the programs and the like, and for example is a volatile memory such as a DRAM (dynamic random access memory).

As illustrated in FIG. 4, the circulation unit 6 includes at least a spout unit 20, a drainage unit 30, and a purification unit 40.

In the circulation unit 6, the spout unit 20 has a function of causing water purified by the purification unit 40 to spout from the spout 13 of the faucet 12.

The spout unit 20 mainly includes a spout pump 21, a UV sterilization section 22, and the infrared sensor 23.

The spout pump 21 is arranged at a subsequent stage to a water storage tank 46 that is provided in the purification unit 40. The spout pump 21 is operated under the control of the controller 60 to send water stored in the water storage tank 46 to the UV sterilization section 22.

Specifically, the controller 60 actuates the spout pump 21 in response to detection of an object by the infrared sensor 23. For example, the controller 60 causes the spout pump 21 to operate during a period in which an object is detected by the infrared sensor 23. When the object is no longer detected by the infrared sensor 23, the controller 60 stops the spout pump 21.

The UV sterilization section 22 is arranged between the spout pump 21 and the faucet 12. The UV sterilization section 22 irradiates ultraviolet rays at water sent from the spout pump 21 to subject the water to a sterilization treatment. Water that has passed through the UV sterilization section 22 is spouted from the spout 13 of the faucet 12 as washing water.

An air vent 72 for removing air in the water sent from the spout pump 21 is provided between the spout pump 21 and the UV sterilization section 22.

In the circulation unit 6, the drainage unit 30 has a function of draining washing water spouted from the faucet 12 toward the wash-hand basin 11.

The drainage unit 30 mainly includes a trap 35, a capacitance sensor 31, and a drainage pump 32.

The trap 35 is provided in a pipe that drains washing water from the wash-hand basin 11. The trap 35 prevents, for example, a backward flow of a bad odor or gas or the like, and also prevents a foreign matter which entered from the drainage outlet 17 from reaching the purification unit 40.

The drainage pump 32 is arranged at a subsequent stage to the trap 35. The drainage pump 32 is operated under control of the controller 60, and sends water that passed through the trap 35 to a pretreatment filter 41 provided in the purification unit 40.

Specifically, the controller 60 actuates the drainage pump 32 in response to the detection of water by the capacitance sensor 31. For example, the controller 60 causes the drainage pump 32 to operate during a period in which water is detected by the capacitance sensor 31. When water is no longer detected by the capacitance sensor 31, the controller 60 stops the drainage pump 32.

The capacitance sensor 31 is arranged between the trap 35 and the drainage pump 32. The capacitance sensor 31 detects the capacitance inside the drainage pipe. By this means, water drained from the wash-hand basin 11 and supplied through the trap 35 is detected. Note that, a sensor for detecting the supply of water is not limited to the capacitance sensor 31. The supply of water may be detected by referring to a different sensing result.

An air vent 70 for removing air in the water sent from the drainage pump 32 is provided between the drainage pump 32 and the purification unit 40.

In the circulation unit 6, the purification unit 40 has a function of purifying the water supplied from the drainage unit 30.

The purification unit 40 mainly includes the pretreatment filter 41, a reverse osmosis membrane 42, a post-treatment filter 43, an intermediate tank 44, a drainage tank 45, the water storage tank 46, and a membrane filtration pump 47.

The pretreatment filter 41 is arranged at a subsequent stage to the drainage pump 32. The pretreatment filter 41 subjects the water sent from the drainage pump 32 to a pretreatment that removes a solid content, water polluting components, low-molecular-weight compound surfactants, carbonic acid components (detergent components), and the like.

Although in the present embodiment an activated carbon filter is adopted as the pretreatment filter 41, the present disclosure is not limited thereto. For example, at least any one of a string wound filter, a sediment filter, an MF (microfiltration membrane), a UF (ultrafiltration membrane), an NF (nano-filtration membrane), a ceramic filter, an ion exchange filter, and a metal membrane may be selected. In the present embodiment, the pretreatment filter 41 is arranged outside the casing 2 as a part of the externally attached module 7.

A pressure sensor 33 is arranged at a preceding stage to the pretreatment filter 41. The pressure sensor 33 detects a pressure of water supplied to the pretreatment filter 41.

A flow rate sensor 34 is arranged at a subsequent stage to the pretreatment filter 41. The flow rate sensor 34 detects a flow rate of water pretreated by the pretreatment filter 41.

The intermediate tank 44 is arranged at a subsequent stage to the pretreatment filter 41. The intermediate tank 44 is a tank for storing supplied water. Water subjected to the pretreatment by the pretreatment filter 41 and concentrated water separated by the reverse osmosis membrane 42 and passed through a two-way solenoid valve 74 flow into the intermediate tank 44. The intermediate tank 44 stores the water that flows in from these two systems.

A water level sensor is arranged in the intermediate tank 44. The water level sensor detects a level of the water stored inside the intermediate tank 44.

The membrane filtration pump 47 is arranged between the intermediate tank 44 and the reverse osmosis membrane 42.

The membrane filtration pump 47 is operated under the control of the control unit 60, and pressurizes the water stored in the intermediate tank 44 to a preset pressure and supplies the water to the reverse osmosis membrane 42. Note that, the preset pressure is, for example, a pressure that is at least higher than the osmotic pressure.

The reverse osmosis membrane 42 is housed in the membrane unit 80 that is installed inside the casing 2. The details of the membrane unit 80 which houses the reverse osmosis membrane 42 are described later.

The reverse osmosis membrane 42 separates the water pressurized to a high pressure and supplied by the membrane filtration pump 47 into permeated water from which dissolved components have been removed, and concentrated water in which dissolved components have been concentrated. The reverse osmosis membrane 42 is realized, for example, by a spiral reverse osmosis membrane.

When the two-way solenoid valve 74 is open, the concentrated water separated by the reverse osmosis membrane 42 is discharged to the intermediate tank 44 through the two-way solenoid valve 74 and a pressure regulating valve 73. Further, when a two-way solenoid valve 75 is open, the concentrated water separated by the reverse osmosis membrane 42 is discharged to the drainage tank 45 through the two-way solenoid valve 75. In addition, the permeated water separated by the reverse osmosis membrane 42 is discharged to the post-treatment filter 43.

The two-way solenoid valve 74 is a device that opens and closes a valve using the electromagnetic force of an electromagnetic coil. The two-way solenoid valve 74 has a structure in which the valve is open in a normal state, and which closes the valve in response to a signal from the controller 60.

The pressure regulating valve 73 regulates a flow rate or pressure of the concentrated water that is supplied to the intermediate tank 44.

The two-way solenoid valve 75 is a device that opens and closes a valve using the electromagnetic force of an electromagnetic coil. The two-way solenoid valve 75 has a structure in which the valve is closed in a normal state, and which opens the valve in response to a signal from the controller 60.

A sensor section 61 is arranged at a preceding stage to the reverse osmosis membrane 42. In the illustrated example, the sensor section 61 has a pressure sensor, a flow rate sensor, and an EC/temperature sensor.

The pressure sensor detects a pressure of the water supplied to the reverse osmosis membrane 42.

The flow rate sensor detects a flow rate of the water supplied to the reverse osmosis membrane 42.

The EC/temperature sensor detects the electric conductivity and temperature of the water supplied to the reverse osmosis membrane 42.

Note that, besides the aforementioned sensors, the sensor section 61 may also have a sensor that senses at least one of the items listed below.
 (1) pH, oxidation-reduction potential, alkalinity, ion concentration, hardness
 (2) Turbidity, chromaticity, viscosity, dissolved oxygen
 (3) Odor, ammonia nitrogen, nitrate nitrogen, nitrite nitrogen, total nitrogen, residual chlorine, total phosphorus, total organic carbon, total inorganic carbon, total trihalomethane
 (4) A detection result of a microbial sensor, chemical oxygen demand, biological oxygen demand
 (5) Cyanogen, mercury, an oil content, surfactants
 (6) A detection result of an optical sensor, a detection result of a TDS (total dissolved solids) sensor
 (7) A mass spectrometry result, fine particles, zeta potential, surface potential An air vent 71 for removing air in the water sent from the membrane filtration pump 47 is provided between the membrane filtration pump 47 and the sensor section 61.

The post-treatment filter 43 is arranged at a subsequent stage to the reverse osmosis membrane 42. The post-treatment filter 43 subjects the permeated water discharged from the reverse osmosis membrane 42 to a post-treatment that removes impurities which could not be completely filtered by the reverse osmosis membrane 42.

Although in the present embodiment an activated carbon filter is adopted as the post-treatment filter 43, the present disclosure is not limited thereto. For example, at least any one of a string wound filter, a sediment filter, an MF (microfiltration membrane), a UF (ultrafiltration membrane), an NF (nano-filtration membrane), a ceramic filter, an ion exchange filter, and a metal membrane may be selected. In the present embodiment, the post-treatment filter 43 is arranged outside the casing 2 as a part of the externally attached module 7.

A sensor section 62 is arranged at a preceding stage to the post-treatment filter 43. In the illustrated example, the sensor section 62 has a pressure sensor, a flow rate sensor, and an EC/temperature sensor.

The pressure sensor detects a pressure of the permeated water supplied to the post-treatment filter 43.

The flow rate sensor detects a flow rate of the permeated water supplied to the post-treatment filter 43.

The EC/temperature sensor detects the electric conductivity and temperature of the permeated water supplied to the post-treatment filter 43.

Note that, besides the aforementioned sensors, the sensor section 62 may also have a sensor that senses at least one of the items (1) to (7) listed above in the description of the sensor section 61.

The drainage tank 45 (second tank) is arranged at a subsequent stage to the two-way solenoid valve 75.

The drainage tank 45 is a tank for storing discharged water that is supplied thereto. The drainage tank 45 can be detached from the purification unit 40, and taken out through the door 3.

Concentrated water separated by the reverse osmosis membrane 42 and passed through the two-way solenoid valve 75 flows into the drainage tank 45. The drainage tank 45 stores the concentrated water that flows in.

A water level sensor is arranged in the drainage tank 45. The water level sensor detects a level of the discharged water stored in the drainage tank 45.

The water storage tank 46 (third tank) is arranged at a subsequent stage to the post-treatment filter 43. The water storage tank 46 is a tank for storing water supplied thereto.

Water subjected to post-treatment by the post-treatment filter 43 flows into the water storage tank 46. Hypochlorous acid water is added to the water that flows into the water storage tank 46. The water storage tank 46 stores the water to which the hypochlorous acid water has been added and which flows into the water storage tank 46.

A water level sensor is arranged in the water storage tank 46. The water level sensor detects a level of the water stored in the water storage tank 46.

The purification unit 40 includes a chlorine tank 67 and a chlorine pump 68.

The chlorine tank 67 is a tank for storing hypochlorous acid water. The hypochlorous acid water is generated, for example, by dissolving a hypochlorous acid tablet in water supplied to the chlorine tank 67. Alternatively, the hypochlorous acid water may be generated by dissolving sodium chloride in the water supplied to the chlorine tank 67, and electrolyzing the saline solution.

Note that, an electrolysis unit that subjects a saline solution to electrolysis to generate hypochlorous acid water may be separately provided on a downstream side of the chlorine tank 67.

A water level sensor is arranged in the chlorine tank 67. The water level sensor detects a level of the hypochlorous acid water stored in the chlorine tank 67.

The chlorine pump 68 is arranged at a subsequent stage to the chlorine tank 67. The chlorine pump 68 is operated under the control of the controller 60 to add hypochlorous acid water stored in the chlorine tank 67 to the water subjected to the post-treatment by the post-treatment filter 43.

A pharmaceutical agent tank 50 and a pharmaceutical agent pump 51 are provided as the pharmaceutical agent unit 5 inside the casing 2.

The pharmaceutical agent pump 51 is arranged at a subsequent stage to the pharmaceutical agent tank 50. The pharmaceutical agent pump 51 is operated under the control of the controller 60, and sends a pharmaceutical agent (for example, soapy water) that is stored in the pharmaceutical agent tank 50 to the nozzle of the dispenser 14.

Specifically, the controller 60 actuates the pharmaceutical agent pump 51 in response to the detection of an object by the infrared sensor 52 of the dispenser 14. For example, the controller 60 causes the pharmaceutical agent pump 51 to operate during a period in which an object is detected by the infrared sensor 52. When an object is no longer detected by the infrared sensor 52, the controller 60 stops the pharmaceutical agent pump 51.

The pharmaceutical agent tank 50 is a tank for storing a pharmaceutical agent. A liquid level sensor is arranged in the pharmaceutical agent tank 50. The liquid level sensor detects a level of the pharmaceutical agent stored inside the pharmaceutical agent tank 50. When the level of the pharmaceutical agent drops below a predetermined value, the pharmaceutical agent is replenished.

<Configuration of Externally Attached Module 7>

Figure 5:
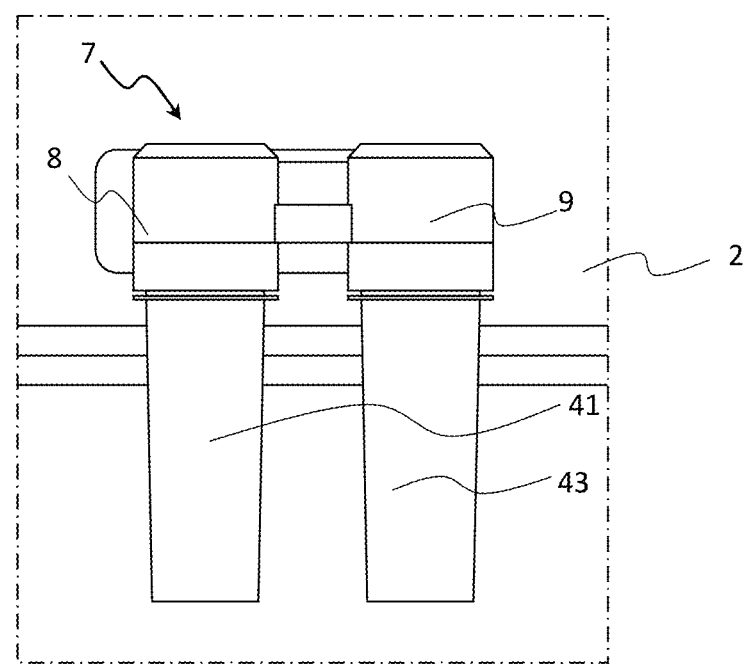
FIG. 5 is a front view of an externally attached module shown in FIG. 1.

FIG. 5 is a front view of the externally attached module 7 shown in FIG. 1.

As illustrated in FIG. 5, the externally attached module 7 has the pretreatment filter 41 and the post-treatment filter 43.

The pretreatment filter 41 and the post-treatment filter 43 are arranged side by side at the exterior of the casing 2. More specifically, the pretreatment filter 41 and the post-treatment filter 43 are arranged side by side in a horizontal direction at the exterior of the casing 2.

The pretreatment filter 41 is detachably attached to an attachment section 8. The post-treatment filter 43 is detachably attached to an attachment section 9.

The pretreatment filter 41 and the post-treatment filter 43 are housed in a container having transparency whose interior is visible. Therefore, the pretreatment of water in the pretreatment filter 41, and the post-treatment of water in the post-treatment filter 43 can be visually observed from the outside.

Turbid water can be confirmed by visual observation in the pretreatment by the pretreatment filter 41. Further, it can be confirmed by visual observation that the water is purified into clean water in the post-treatment by the post-treatment filter 43.

<Configuration of Membrane Unit 80>

Figure 6A:
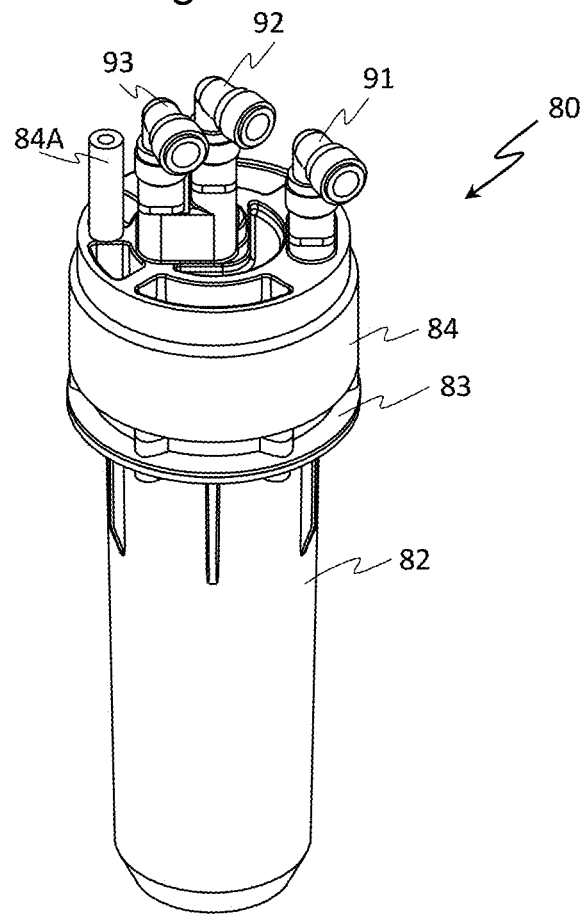
FIG. 6A is external view of the membrane unit.
Figure 6B:
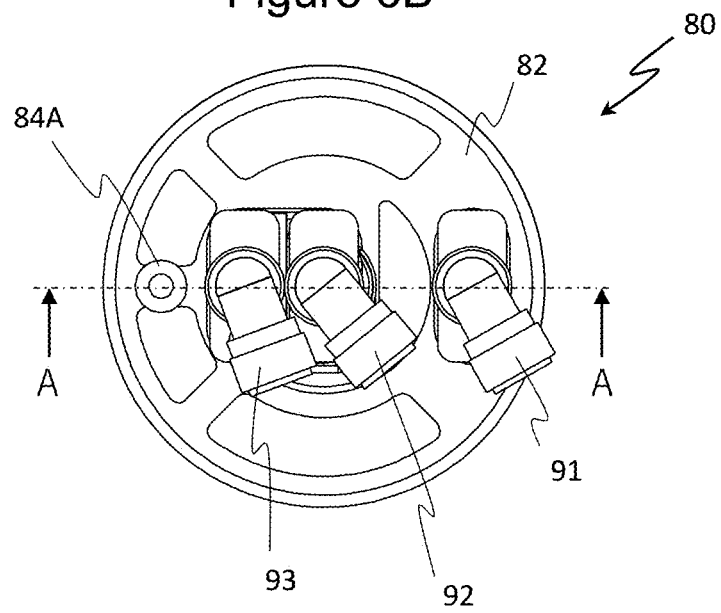
FIG. 6B is top view of the membrane unit.

FIG. 6 is external views of the membrane unit 80 that houses the reverse osmosis membrane 42. FIG. 6A is an external perspective view of the membrane unit 80, and FIG. 6B is a top view of the membrane unit 80.

As illustrated in FIG. 6A and FIG. 6B, the membrane unit 80 has a cylindrical shape. A first nozzle 91, a second nozzle 92 and a third nozzle 93 are connected to an upper face of the membrane unit 80. The first nozzle 91, the second nozzle 92, and the third nozzle 93 are connected to the inside of a casing 82 through internal openings 86A to 86C, respectively, which will be described later.

A piping tube (not illustrated) is connected to a tip portion of the first nozzle 91, and is connected to the membrane filtration pump 47 shown in FIG. 4. Water pressurized by the membrane filtration pump 47 is supplied to the first nozzle 91.

A piping tube (not illustrated) is connected to a tip portion of the second nozzle 92, and is connected to the post-treatment filter 43 shown in FIG. 4. Permeated water separated by the membrane unit 80 is discharged through the second nozzle 92 to the post-treatment filter 43.

A piping tube (not illustrated) is connected to a tip portion of the third nozzle 93, and is connected to the intermediate tank 44 and the drainage tank 45 shown in FIG. 4. Concentrated water separated by the membrane unit 80 is discharged through the third nozzle 93 to the intermediate tank 44 or the drainage tank 45.

As illustrated in FIG. 6B, the first nozzle 91, the second nozzle 92, and the third nozzle 93 are arranged collinearly on the upper face of the membrane unit 80. The second nozzle 92 is located at the center of a socket 84.

Figure 7:
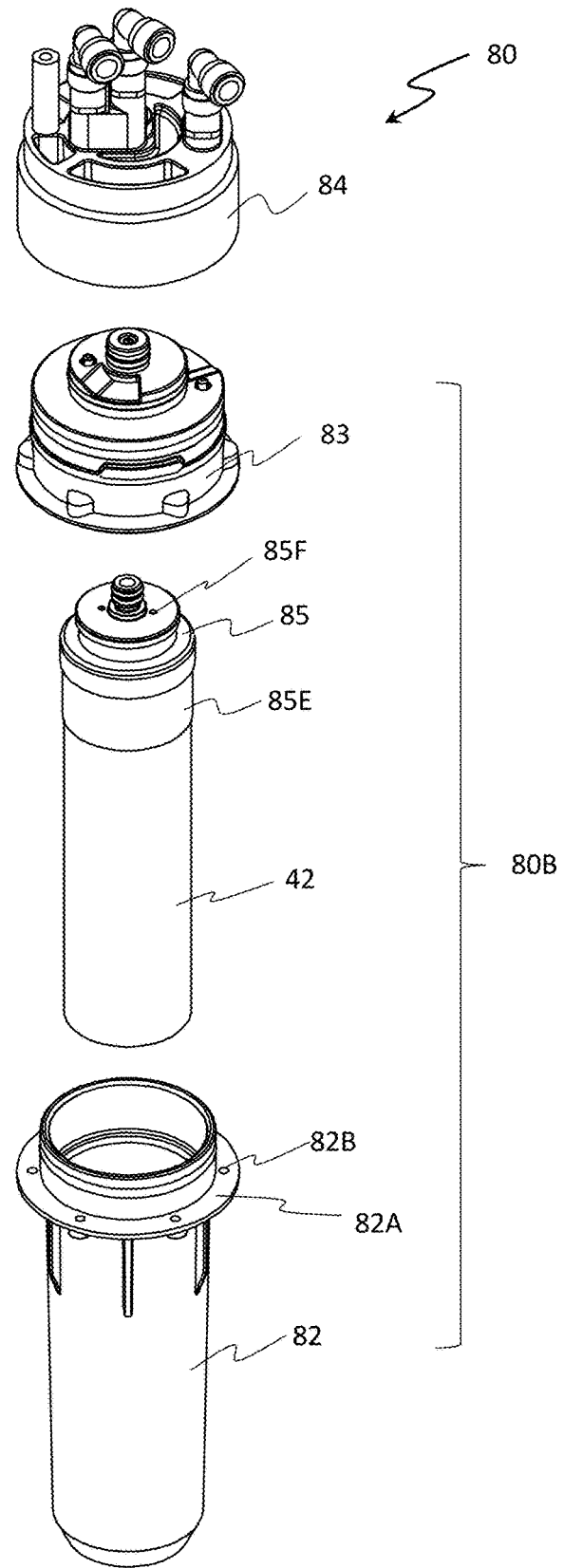
FIG. 7 is an exploded perspective view of the membrane unit.
Figure 8:
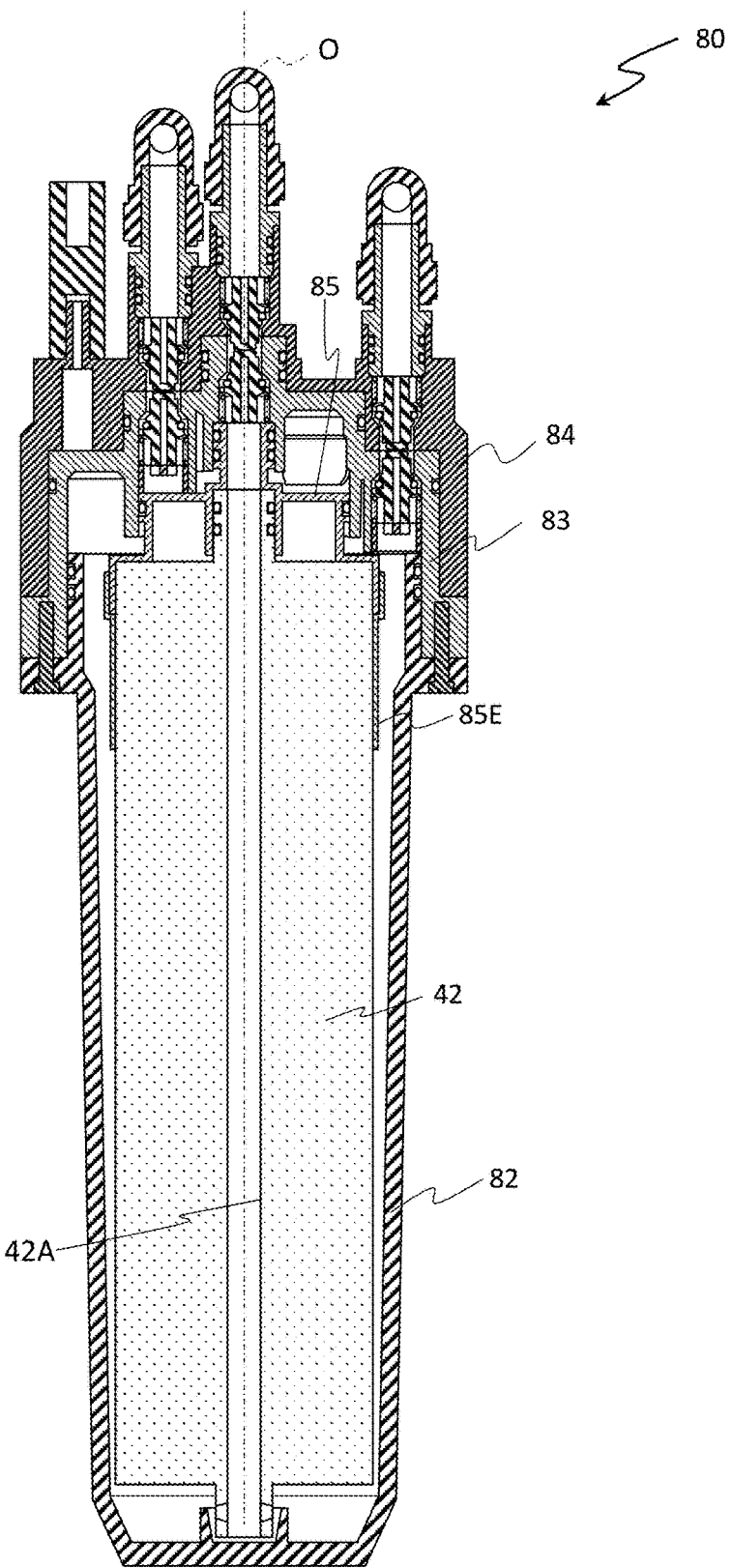
FIG. 8 is a cross-sectional view along a line A-A of the membrane unit in FIG. 6B.
Figure 9:
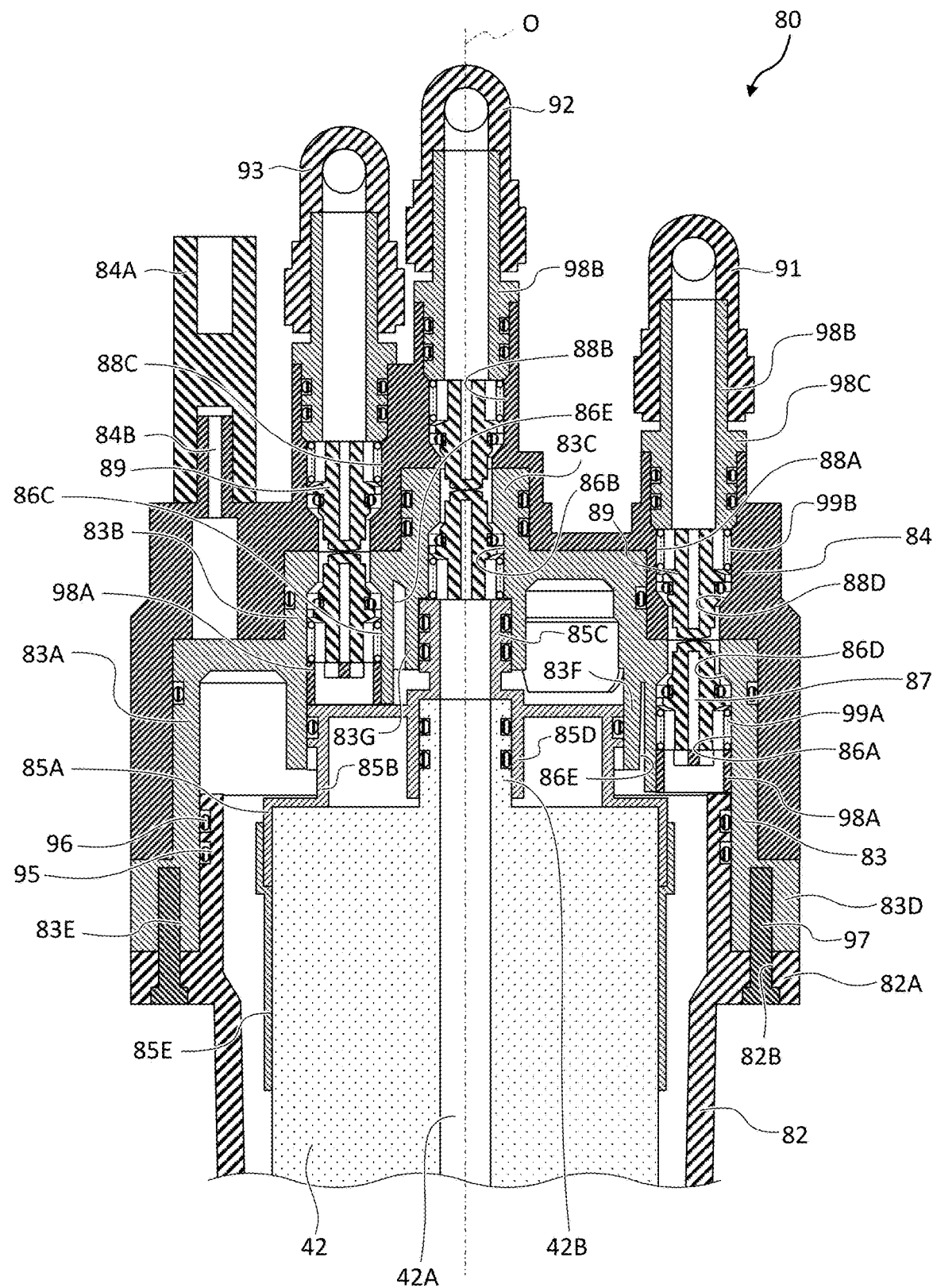
FIG. 9 is an enlarged view of principal parts in FIG. 8.

FIG. 7 is an exploded perspective view of the membrane unit 80 of the present disclosure. FIG. 8 is a cross-sectional view along a line A-A of the membrane unit 80 illustrated in FIG. 6B. FIG. 9 is an enlarged view of principal parts in FIG. 8.

As illustrated in FIG. 7 and FIG. 8, the membrane unit 80 includes the reverse osmosis membrane 42, the casing 82 (housing element) having a bottomed cylindrical shape, a cap 83, the socket 84, and a positioning member 85. The reverse osmosis membrane 42, the casing 82, the cap 83, and the positioning member 85 are replacement parts, and form a replacement unit 80B as an object to be distributed.

In the following description, a direction along a central axis O of the casing 82 is referred to as an "axial direction", a direction perpendicular to the central axis O is referred to as a "radial direction", and a direction of rotation around the central axis O is referred to as a "circumferential direction".

Further, taking the interior of the casing 82 as a reference, a bottom side of the casing 82 in the axial direction is referred to as a "lower side", and an opposite side thereto is referred to as an "upper side".

Note that, the distinction between the top and the bottom is for convenience in describing the structure, and is not intended to limit the posture in which the membrane unit 80 is used.

(Structure of Reverse Osmosis Membrane 42)

As illustrated in FIG. 8, the reverse osmosis membrane 42 has a substantially columnar shape. A pipe 42A that penetrates the reverse osmosis membrane 42 in the axial direction is inserted at a central part in the radial direction of the reverse osmosis membrane 42. A channel through which permeated water that permeated the reverse osmosis membrane 42 flows down is formed in the pipe 42A. For example, a crosslinked polyamide-based composite membrane can be adopted as the reverse osmosis membrane 42. Note that, a material of the reverse osmosis membrane 42 can be arbitrarily changed.

As illustrated in FIG. 9, a fixing portion 42B having a smaller diameter than other portions is formed at an upper end portion of the reverse osmosis membrane 42. Grooves are formed along an entire circumference of an outer peripheral surface of the fixing portion 42B. Two grooves are arranged in the axial direction with an interval therebetween. An O-ring is housed in the respective grooves. The O-rings are interposed between the reverse osmosis membrane 42 and the positioning member 85 to prevent a liquid from leaking out from between the cap 83 and the casing 82.

(Structure of Casing 82)

The casing 82 is a member that houses the reverse osmosis membrane 42 therein.

As illustrated in FIG. 8 and FIG. 9, inside the casing 82 the reverse osmosis membrane 42 is arranged so that a central axis of the reverse osmosis membrane 42 is coaxial with the central axis O of the casing 82.

A flange 82A that protrudes outward in the radial direction is formed at an upper part of an outer peripheral surface of the casing 82. As illustrated in FIG. 7, a through hole 82B into which a fastening screw 97 is to be inserted is formed in the flange 82A. As illustrated in FIG. 9, a bearing surface on which the fastening screw 97 which is inserted from below the through hole 82B is seated is formed so as to face downward in the through hole 82B. A plurality of the through holes 82B are formed in the flange 82A of the casing 82 at intervals in the circumferential direction.

As illustrated in FIG. 9, grooves 95 extending over an entire region in the circumferential direction are formed in a portion of the outer peripheral surface of the casing 82 that is located above the flange 82A. An O-ring 96 is housed in each of the grooves 95. Two of the O-rings 96 are arranged with an interval therebetween in the axial direction. By interposing the O-rings 96 between the cap 83 and the casing 82, the leakage of a liquid stored in the casing 82 is prevented.

The casing 82 is, for example, molded by injection molding of a synthetic resin material. Note that, a material of the casing 82 can be arbitrarily changed.

(Structure of Cap 83)

The cap 83 is a member that is detachably attached to the casing 82.

As illustrated in FIG. 9, the cap 83 has a cylindrical shape including a top part, and opens in a downward direction. The cap 83 has a multi-step cylindrical shape in which a position of the top part in the axial direction differs according to the position thereof in the radial direction.

The cap 83 includes a large-diameter cylindrical portion 83A, an intermediate cylindrical portion 83B, and a small-diameter cylindrical portion 83C. The large-diameter cylindrical portion 83A, the intermediate cylindrical portion 83B, and the small-diameter cylindrical portion 83C are arranged so that respective central axes thereof are coaxial with the central axis O. A top part is formed in the large-diameter cylindrical portion 83A, the intermediate cylindrical portion 83B, and the small-diameter cylindrical portion 83C, respectively.

In the cap 83, the large-diameter cylindrical portion 83A is formed with the largest outer diameter. A flange 83D that protrudes outward in the radial direction is formed over an entire circumference of a lower end portion of the large-diameter cylindrical portion 83A. A screw hole 83E into which the fastening screw 97 is to be fastened is formed in the flange 83D of the large-diameter cylindrical portion 83A.

A plurality of the screw holes 83E are formed at intervals in the circumferential direction in the flange 83D. The screw hole 83E is arranged so as to communicate in the axial direction with the through hole 82B of the casing 82.

A groove is formed over an entire region in the circumferential direction in an outer peripheral surface of the large-diameter cylindrical portion 83A. An O-ring is housed inside the groove. The O-ring prevents a liquid from leaking out from between the large-diameter cylindrical portion 83A and the socket 84.

A fixing cylindrical portion 83F that extends downward is formed on a rear face of a top part of the large-diameter cylindrical portion 83A of the cap 83. The fixing cylindrical portion 83F is arranged so that a central axis of the fixing cylindrical portion 83F is coaxial with the central axis O. An outer diameter and an inner diameter of the fixing cylindrical portion 83F are equal to an outer diameter and an inner diameter of the intermediate cylindrical portion 83B.

The intermediate cylindrical portion 83B has a smaller outer diameter than the outer diameter of the large-diameter cylindrical portion 83A, and is formed at the top part of the large-diameter cylindrical portion 83A.

A groove is formed over an entire region in the circumferential direction in an outer peripheral surface of the intermediate cylindrical portion 83B. An O-ring is housed inside the groove. The O-ring prevents a liquid from leaking out from between the intermediate cylindrical portion 83B and the socket 84.

A fixing cylindrical portion 83G that extends downward is formed on a rear face of a top part of the intermediate cylindrical portion 83B. The fixing cylindrical portion 83G is arranged so that a central axis of the fixing cylindrical portion 83G is coaxial with the central axis O. An inner diameter of the fixing cylindrical portion 83G is equal to an outer diameter of the small-diameter cylindrical portion 85C.

The small-diameter cylindrical portion 83C has a smaller outer diameter than the intermediate cylindrical portion 83B, and is formed at the top part of the intermediate cylindrical portion 83B.

A groove is formed over the entire region in the circumferential direction in an outer peripheral surface of the small-diameter cylindrical portion 83C. An O-ring is housed inside the groove. The O-ring prevents a liquid from leaking out from between the small-diameter cylindrical portion 83C and the socket 84.

In the cap 83, for example, the large-diameter cylindrical portion 83A, the intermediate cylindrical portion 83B, and the small-diameter cylindrical portion 83C are formed integrally with each other. The cap 83 is, for example, molded by injection molding of a synthetic resin material. Note that, a material of the cap 83 can be arbitrarily changed.

The flange 83D of the cap 83 is placed on an upper face of the flange 82A of the casing 82.

The casing 82 and the cap 83 are fastened together by the fastening screws 97 that are inserted into the screw holes 83E of the cap 83 through the through holes 82B of the casing 82. By this means, the casing 82 and the cap 83 are fixed to each other, and the cap 83 occludes the casing 82. Further, by removing the fastening screws 97, the cap 83 can be detached from the casing 82, and the reverse osmosis membrane 42 inside the casing 82 can be taken out (see FIG. 12).

As illustrated in FIG. 9, a plurality of openings 86A to 86C are formed in the cap 83. The plurality of openings 86A to 86C include an inflow port 86A, a first discharge port 86B, and a second discharge port 86C.

The inflow port 86A is formed in the top part of the large-diameter cylindrical portion 83A in the cap 83, and penetrates the large-diameter cylindrical portion 83A in the axial direction. The inflow port 86A is formed in the top part of the cap 83 at a position located at an outer end part of the top part. In the inflow port 86A, a diameter of an upper end portion is reduced relative to other portions. On an inner peripheral surface of the inflow port 86A, a first tapered surface 86D where an inner diameter gradually narrows in an upward direction is formed at a portion that extends to the upper end portion from below.

The first discharge port 86B is formed in the top part of the small-diameter cylindrical portion 83C in the cap 83, and penetrates the small-diameter cylindrical portion 83C in the axial direction. The first discharge port 86B is formed in the top part of the cap 83 at a position located at a center part of the top part. The first discharge port 86B is arranged so that a central axis of the first discharge port 86B is coaxial with the central axis O. In the first discharge port 86B, a diameter of an upper end portion is reduced relative to other portions. On an inner peripheral surface of the first discharge port 86B, the first tapered surface 86D where the inner diameter gradually narrows in the upward direction is formed at a portion that extends to the upper end portion from below.

The second discharge port 86C is formed in the top part of the intermediate cylindrical portion 83B in the cap 83, and penetrates the intermediate cylindrical portion 83B in the axial direction. The second discharge port 86C is formed in the top part of the cap 83 at a position located at an intermediate part of the top part. In the second discharge port 86C, a diameter of an upper end portion is reduced relative to other portions. On an inner peripheral surface of the second discharge port 86C, the first tapered surface 86D where the inner diameter gradually narrows in the upward direction is formed at a portion that extends to the upper end portion from below.

A distance between the first discharge port 86B and the inflow port 86A (first distance), and a distance between the first discharge port 86B and the second discharge port 86C (second distance) are different to each other. Specifically, the first distance is greater than the second distance.

In the cap 83, a slit 86E is formed on an outer side in the radial direction of the inflow port 86A and the second discharge port 86C. The slits 86E expand diameters of the inflow port 86A and the second discharge port 86C radially outward, respectively, when a stopper to be described later is press-fitted into the inflow port 86A and the second discharge port 86C.

A tip portion that is located above the first tapered surface 86D in the first discharge port 86B is longer than a tip portion located above the first tapered surface 86D in the inflow port 86A. The tip portion located above the first tapered surface 86D in the first discharge port 86B is longer than a tip portion located above the first tapered surface 86D in the second discharge port 86C.

(Structure of First Valve Member 87)

In the cap 83, a first valve member 87 is mounted in the inflow port 86A, the first discharge port 86B, and the second discharge port 86C, respectively. The first valve members 87 are members that are responsible for opening and closing of the inflow port 86A, the first discharge port 86B, and the second discharge port 86C.

The first valve members 87 are installed in a manner so as to be movable along a channel direction in the inflow port 86A, the first discharge port 86B, and the second discharge port 86C, respectively.

Figure 10A:
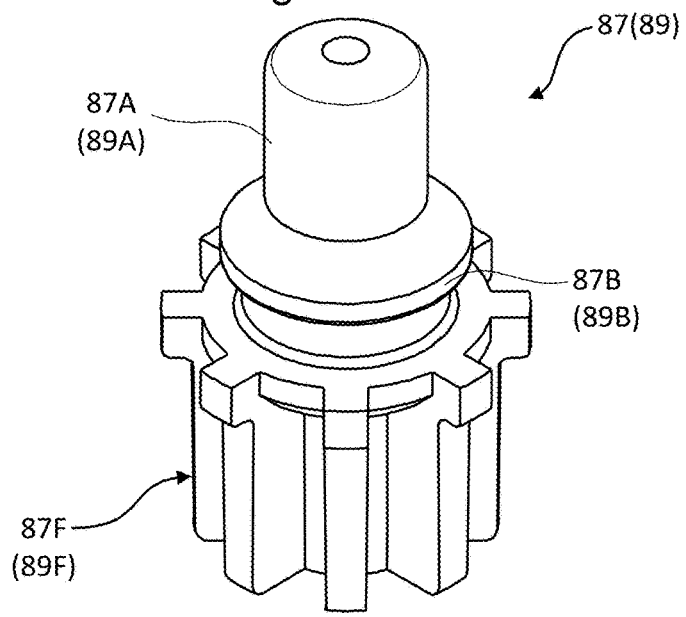
FIG. 10A is an external view of a valve member used in the membrane unit.
Figure 10B:
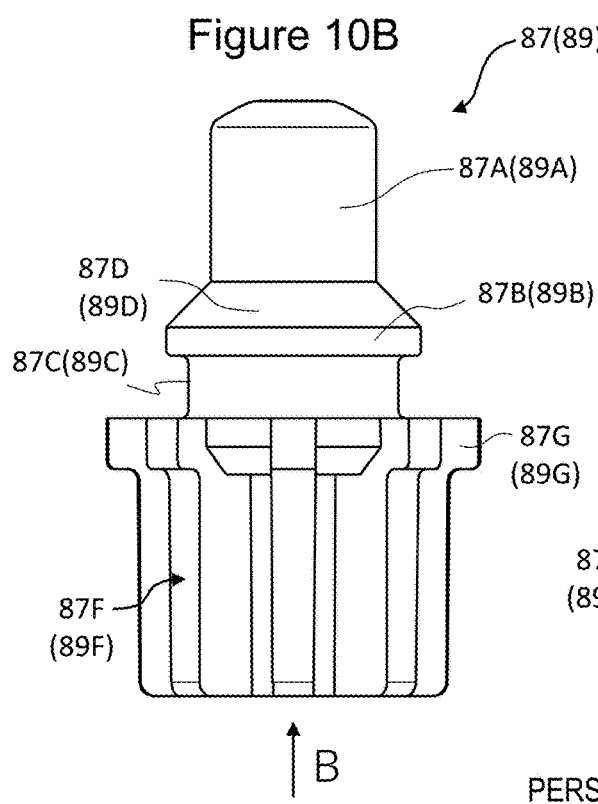
FIG. 10B is a side view of the valve member.
Figure 10C:
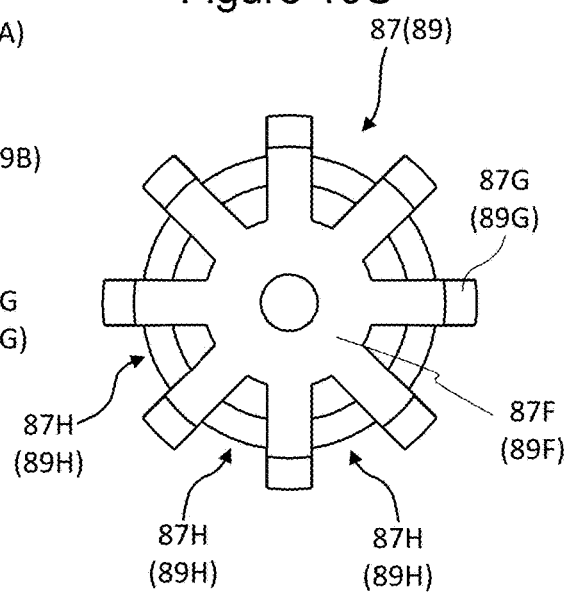
FIG. 10C is a bottom view of the valve member shown in FIG. 10B.

FIG. 10 is a multiple view drawings showing external views of the first valve member 87. FIG. 10A is an oblique perspective view of the first valve member 87, FIG. 10B is a front view of the first valve member 87, and FIG. 10C is a perspective view from a direction of an arrow B in FIG. 10B. Second valve members 89 having the same structure as the first valve member 87 are arranged in the socket 84. The second valve members 89 are members that are responsible for opening and closing of a first hole portion 88A, a second hole portion 88B, and a third hole portion 88C, respectively, in the socket 84. In FIG. 10, reference characters relating to the second valve member 89 are also shown, although a description thereof is omitted here.

As illustrated in FIG. 10A, the first valve member 87 has a shaft shape. The first valve member 87 includes a first columnar portion 87A, a second columnar portion 87B, a groove portion 87C, a tapered surface 87D, a support portion 87F, and a spring receiving portion 87G. The first columnar portion 87A, the second columnar portion 87B, the groove portion 87C, the tapered surface 87D, the support portion 87F, and the spring receiving portion 87G are formed side by side in the axial direction. The first columnar portion 87A, the second columnar portion 87B, the groove portion 87C, the tapered surface 87D, the support portion 87F, and the spring receiving portion 87G are formed so as to be coaxial with each other. In the description of FIG. 10, a first columnar portion 87A side in the axial direction is referred to as "upward", and a support portion 87F side in the axial direction is referred to "downward". Note that, the distinction between the top and the bottom is for convenience in the description, and is not intended to limit the posture in which the first valve member 87 is used.

As illustrated in FIG. 10B, the first columnar portion 87A of the first valve member 87 has a columnar shape. As illustrated in FIG. 9, an outer diameter of the first columnar portion 87A is smaller than an inner diameter of a tip portion of the inflow port 86A, the first discharge port 86B, and the second discharge port 86C, respectively. An end portion of the first columnar portion 87A has a tapered surface, and is formed so that the outer diameter becomes narrower toward the end portion.

The second columnar portion 87B is formed below the first columnar portion 87A. The second columnar portion 87B has a columnar shape. An outer diameter of the second columnar portion 87B is larger than the outer diameter of the first columnar portion 87A. The outer diameter of the second columnar portion 87B is approximately equal to the inner diameter of the tip portion of the inflow port 86A, the first discharge port 86B, and the second discharge port 86C, respectively. Therefore, when the first valve member 87 is urged upward, the second columnar portion 87B is inserted inside the tip portion of the inflow port 86A, the first discharge port 86B, and the second discharge port 86C, respectively (see FIG. 13).

As illustrated in FIG. 10, the tapered surface 87D that is inclined so that an outer diameter thereof gradually narrows in the upward direction is formed between the first columnar portion 87A and the second columnar portion 87B. Because the tapered surface 87D is formed at the upper end portion of the second columnar portion 87B, when the first valve member 87 is urged upward, the first valve member 87 moves upward along the tapered surface 87D and the second columnar portion 87B smoothly enters the inflow port 86A, the first discharge port 86B, and the second discharge port 86C.

As illustrated in FIG. 10, the groove portion 87C that is recessed inward in the radial direction is formed below the second columnar portion 87B. The groove portion 87C is formed over an entire region in the circumferential direction. As illustrated in FIG. 9, an O-ring is mounted in the groove 87C.

The support portion 87F of the first valve member 87 has a columnar shape. The spring receiving portion 87G that protrudes outward in the radial direction is formed at the upper end portion of the support portion 87F. The spring receiving portion 87G is formed over an entire circumference of the support portion 87F. An outer diameter of the spring receiving portion 87G is a larger diameter than an outer diameter of the second columnar portion 87B and an outer diameter of the support portion 87F.

A notch 87H extending in the axial direction is formed in an outer periphery of the support portion 87F. As illustrated in FIG. 10C, a plurality of the notches 87H are formed at intervals in the circumferential direction in the support portion 87F. Because the notches 87H are formed in the support portion 87F, a fluid flows between the notches 87H when the first tapered surface 86D and the O-ring mounted in the groove portion 87C are separated from each other.

The first valve member 87, for example, is integrally formed by injection molding of a synthetic resin material. For example, an engineering plastic such as polyacetal can be adopted as a material of the first valve member 87. Note that, the material of the first valve member 87 can be arbitrarily changed. For example, the first valve member 87 may be formed by two-color molding in which one portion and another portion are made of different materials to each other.

(Structure Inside Inflow Port 86A and Second Discharge Port 86C)

As illustrated in FIG. 9, the cap 83 includes a stopper 98A (first stopper) at the lower end of the inflow port 86A and the second discharge port 86C, respectively.

The stopper 98A is a member that defines a position of the lower end of the first valve member 87 arranged in the inflow port 86A and the second discharge port 86C, respectively. The stopper 98A has a substantially tubular shape having an outer diameter which is slightly larger than the inner diameter of the inflow port 86A and the second discharge port 86C. The stopper 98A is press-fitted into the lower end of the inflow port 86A and the second discharge port 86C, respectively, so as to retain the first valve member 87 inside the inflow port 86A and the second discharge port 86C, respectively. The respective slits 86E are narrowed as a result of the stoppers 98A being press-fitted into the lower end of the inflow port 86A and the second discharge port 86C.

As illustrated in FIG. 9, the cap 83 includes a first urging member 99A in the inflow port 86A and in the second discharge port 86C, respectively.

The first urging member 99A is a member that urges the first valve member 87. The first urging member 99A is, for example, a coiled spring. The first urging member 99A has an outer diameter which is slightly smaller than the inner diameter of the inflow port 86A and the second discharge port 86C, and an inner diameter which is larger than the outer diameter of the support portion 87F of the first valve member 87 and is smaller than the outer diameter of the spring receiving portion 87G.

Inside the inflow port 86A and the second discharge port 86C, the first valve members 87 are arranged so that the first columnar portion 87A faces an opening direction of the inflow port 86A and the second discharge port 86C, respectively, and the support portion 87F faces a direction of the stopper 98A. The first urging member 99A is arranged between the first valve member 87 and the stopper 98A in the axial direction. The first urging member 99A is arranged so that the lower end thereof is supported by the stopper 98A, and the upper end thereof is in contact with the spring receiving portion 87G of the first valve member 87. The first urging member 99A urges the first valve member 87 upward. By this means, the first columnar portion 87A of the first valve member 87 is pushed into the tip portion of the inflow port 86A and the tip portion of the second discharge port 86C, respectively.

When the first valve member 87 is urged upward by the first urging member 99A, the second columnar portion 87B of the first valve member 87, the O-ring mounted in the groove portion 87C, and the spring receiving portion 87G function as a valve element. At such time, the first tapered surface 86D of each of the inflow port 86A and the second discharge port 86C functions as a valve seat. Specifically, when the first valve members 87 are urged upward by the first urging members 99A, the second columnar portions 87B are inserted into the tip portions of the inflow port 86A and the second discharge port 86C, respectively. When the second columnar portions 87B are further urged upward after being inserted into the inflow port 86A and the second discharge port 86C, respectively, the O-ring mounted in the groove portion 87C receives a reaction force from the first tapered surface 86D and is pushed into the spring receiving portion 87G. In this way, the first valve members 87 block the flow of a fluid through the inflow port 86A and the second discharge port 86C, respectively (see FIG. 13).

(Structure inside First Discharge Port 86B)

The first discharge port 86B is connected in a vertical direction to the inside of the fixing cylindrical portion 83G formed at the rear surface of the top part of the intermediate cylindrical portion 83B. The first discharge port 86B and the fixing cylindrical portion 83G are arranged coaxially with one another. The inner diameter of the first discharge port 86B is smaller than the inner diameter of the fixing cylindrical portion 83G. Therefore, a stepped portion is formed between the fixing cylindrical portion 83G and the first discharge port 86B.

As illustrated in FIG. 9, the cap 83 includes the urging member 99A at the lower end of the first discharge port 86B. The first urging member 99A has an outer diameter which is slightly smaller than the inner diameter of the first discharge port 86B, and has an inner diameter which is larger than the outer diameter of the support portion 87F of the first valve member 87 and is smaller than the outer diameter of the spring receiving portion 87G.

The first valve member 87 is arranged inside the first discharge port 86B so that the first columnar portion 87A faces an opening direction of the first discharge port 86B, and the support portion 87F faces a direction of the urging member 99A. The first urging member 99A is arranged between the first valve member 87 and the small-diameter cylindrical portion 85C of the positioning member 85 in the axial direction. The first urging member 99A is arranged so that the lower end thereof is supported by the small-diameter cylindrical portion 85C, and the upper end thereof is in contact with the spring receiving portion 87G of the first valve member 87. The first urging member 99A urges the first valve member 87 upward. By this means, the first columnar portion 87A of the first valve member 87 is pushed into the tip portion of the first discharge port 86B.

When the first valve member 87 is urged upward by the first urging member 99A, the second columnar portion 87B of the first valve member 87, the O-ring mounted in the groove portion 87C, and the spring receiving portion 87G function as a valve element. At such time, the first tapered surface 86D of the first discharge port 86B functions as a valve seat. Specifically, when the first valve member 87 is urged upward by the first urging member 99A, the second columnar portion 87B is inserted into the tip portion of the first discharge port 86B. When the second columnar portion 87B is further urged upward after being inserted into the first discharge port 86B, the O-ring mounted in the groove portion 87C receives a reaction force from the first tapered surface 86D and is pushed into the spring receiving portion 87G. In this way, the first valve member 87 blocks the flow of a fluid through the first discharge port 86B (see FIG. 13).

(Structure of Positioning Member 85)

The positioning member 85 is a member that defines the position of the reverse osmosis membrane 42 inside the casing 82. As illustrated in FIG. 9, the positioning member 85 has a cylindrical shape including a top part, and opens in a downward direction. The positioning member 85 has a multi-step cylindrical shape in which the position of the top part in the axial direction differs according to the position thereof in the radial direction.

The positioning member 85 includes a large-diameter cylindrical portion 85A, an intermediate cylindrical portion 85B, and a small-diameter cylindrical portion 85C. The large-diameter cylindrical portion 85A, the intermediate cylindrical portion 85B, and the small-diameter cylindrical portion 85C are formed so that the respective central axes thereof are coaxial with the central axis O. A top part is formed in the large-diameter cylindrical portion 85A, the intermediate cylindrical portion 85B, and the small-diameter cylindrical portion 85C, respectively.

In the positioning member 85, the large-diameter cylindrical portion 85A is formed with the largest outer diameter. An inner diameter of the large-diameter cylindrical portion 85A is formed so as to be approximately the same as the outer diameter of the reverse osmosis membrane 42.

The intermediate cylindrical portion 85B has a smaller outer diameter than the outer diameter of the large-diameter cylindrical portion 85A, and is formed at the top part of the large-diameter cylindrical portion 85A. The intermediate cylindrical portion 85B is formed so that the outer diameter thereof is approximately the same as the inner diameter of the fixing cylindrical portion 83F of the cap 83. A groove is formed over an entire region in the circumferential direction on an outer peripheral surface of the intermediate cylindrical portion 85B. An O-ring is housed inside the groove. The O-ring prevents a liquid from leaking out from between the intermediate cylindrical portion 85B of the positioning member 85 and the fixing cylindrical portion 83F of the cap 83 into a space on a second discharge port 86C side.

A fixing cylindrical portion 85D that extends downward is formed at the rear face of the top part of the intermediate cylindrical portion 85B. The fixing cylindrical portion 85D is formed so that a central axis of the fixing cylindrical portion 85D is coaxial with the central axis O.

The small-diameter cylindrical portion 85C has a smaller outer diameter than the outer diameter of the intermediate cylindrical portion 85B, and is formed at the top part of the intermediate cylindrical portion 85B. The small-diameter cylindrical portion 85C is formed so that the outer diameter thereof is approximately the same as the inner diameter of the fixing cylindrical portion 83G formed at the rear face of the intermediate cylindrical portion 83B in the cap 83. The small-diameter cylindrical portion 85C is formed so that the inner diameter thereof is smaller than the inner diameter of the first discharge port 86B of the cap 83 and the outer diameter of the support portion 87F of the first valve member 87.

In a state in which the small-diameter cylindrical portion 85C has been inserted into the fixing cylindrical portion 83G of the cap 83, the small-diameter cylindrical portion 85C supports the support portion 87F of the first valve member 87 arranged inside the first discharge port 86B and the first urging member 99A. At such time, the upper end of the small-diameter cylindrical portion 85C butts against the stepped portion formed between the inner peripheral surface of the fixing cylindrical portion 83G and the first discharge port 86B.

Grooves are formed over an entire region in the circumferential direction on an outer peripheral surface of the small-diameter cylindrical portion 85C. Two grooves are formed with an interval therebetween in the axial direction. An O-ring is housed inside each groove. The O-rings prevent a liquid from leaking out from between the small-diameter cylindrical portion 85C and the fixing cylindrical portion 83G.

In the positioning member 85, the large-diameter cylindrical portion 85A, the intermediate cylindrical portion 85B, and the small-diameter cylindrical portion 85C are formed integrally with each other. The positioning member 85 is, for example, molded by injection molding of a synthetic resin material. Note that, a material of the positioning member 85 can be arbitrarily changed.

A sleeve 85E is mounted on the large-diameter cylindrical portion 85A of the positioning member 85. The sleeve 85E has a substantially tubular shape in which both end portions in the axial direction are open. An outer diameter and an inner diameter of an upper end portion of the sleeve 85E are made wider than an outer diameter and an inner diameter of other portions thereof. The lower end portion of the large-diameter cylindrical portion 85A of the positioning member 85 is inserted into the upper end portion of the sleeve 85E in the radial direction.

A through hole 85F is formed in the top part of the intermediate cylindrical portion 85B of the positioning member 85 (see FIG. 7). The through hole 85F penetrates the top part of the intermediate cylindrical portion 85B in the axial direction. Although an example in which two of the through holes 85F are formed is illustrated in FIG. 7, the number of the through holes 85F is not limited to two.

As illustrated in FIG. 7 and FIG. 8, the reverse osmosis membrane 42 is inserted into the inside of the positioning member 85 and the sleeve 85E. Further, the fixing portion 42B located at the upper end of the reverse osmosis membrane 42 is inserted into the inside of the fixing cylindrical portion 85D of the positioning member 85.

The positioning member 85 is fixed to the cap 83 taking the first discharge port 86B as a reference. The small-diameter cylindrical portion 85C of the positioning member 85 is fitted to the fixing cylindrical portion 83G of the cap 83. The intermediate cylindrical portion 85B of the positioning member 85 is fitted to the fixing cylindrical portion 83F of the cap 83.

As illustrated in FIG. 9, a position in the radial direction of the inflow port 86A formed in the cap 83 is further on an outer side than the outer peripheral surface of the large-diameter cylindrical portion 85A of the positioning member 85 when the small-diameter cylindrical portion 85C has been fitted to the fixing cylindrical portion 83G. That is, a distance from the central axis O to the inflow port 86A is greater than a distance from the central axis O to the outer peripheral surface of the large-diameter cylindrical portion 85A of the positioning member 85. Further, the position in the radial direction of the inflow port 86A is also further on an outer side than the outer peripheral surface of the reverse osmosis membrane 42.

Therefore, water that flows into the casing 82 from the inflow port 86A is not obstructed by the top part of the positioning member 85 and the reverse osmosis membrane 42, and flows down into the casing 82 by passing between the inner peripheral surface of the casing 82 and the large-diameter cylindrical portion 85A of the positioning member 85 and the outer peripheral surface of the reverse osmosis membrane 42.

Further, a position in the radial direction of the second discharge port 86C overlaps with a position of the top part of the intermediate cylindrical portion 85B of the positioning member 85. Specifically, the second discharge port 86C is located above the top part of the intermediate cylindrical portion 85B of the positioning member 85. Therefore, the second discharge port 86C is arranged inside a space formed by the intermediate cylindrical portion 83B of the cap 83 and the top part of the intermediate cylindrical portion 85B. Water that flows into the aforementioned space from the through hole 85F of the intermediate cylindrical portion 85B flows out to outside of the casing 82 from the second discharge port 86C.

(Structure of Socket 84)

The socket 84 is a member that is attached to the cap 83 and opens the plurality of first valve members 87, respectively.

As illustrated in FIG. 9, the socket 84 has a cylindrical shape including an top part, and opens in the downward direction. The socket 84 has a multi-step cylindrical shape in which a position of the top part in the axial direction differs according to a position thereof in the radial direction. An inner surface of the socket 84 has a shape that follows the outer diameter of the top part of the cap 83.

The first hole portion 88A, the second hole portion 88B, and the third hole portion 88C are formed in the top part of the socket 84 so as to penetrate the socket 84 in the vertical direction. The first hole portion 88A is formed at a position that overlaps with the inflow port 86A when the socket 84 is attached to the cap 83. A channel is formed by the first hole portion 88A and the inflow port 86A.

The second hole portion 88B is formed at a position that overlaps with the first discharge port 86B when the socket 84 is attached to the cap 83. A channel is formed by the second hole portion 88B and the first discharge port 86B.

The third hole portion 88C is formed at a position that overlaps with the second discharge port 86C when the socket 84 is attached to the cap 83. A channel is formed by the second hole portion 88B and the second discharge port 86C.

Figure 14:
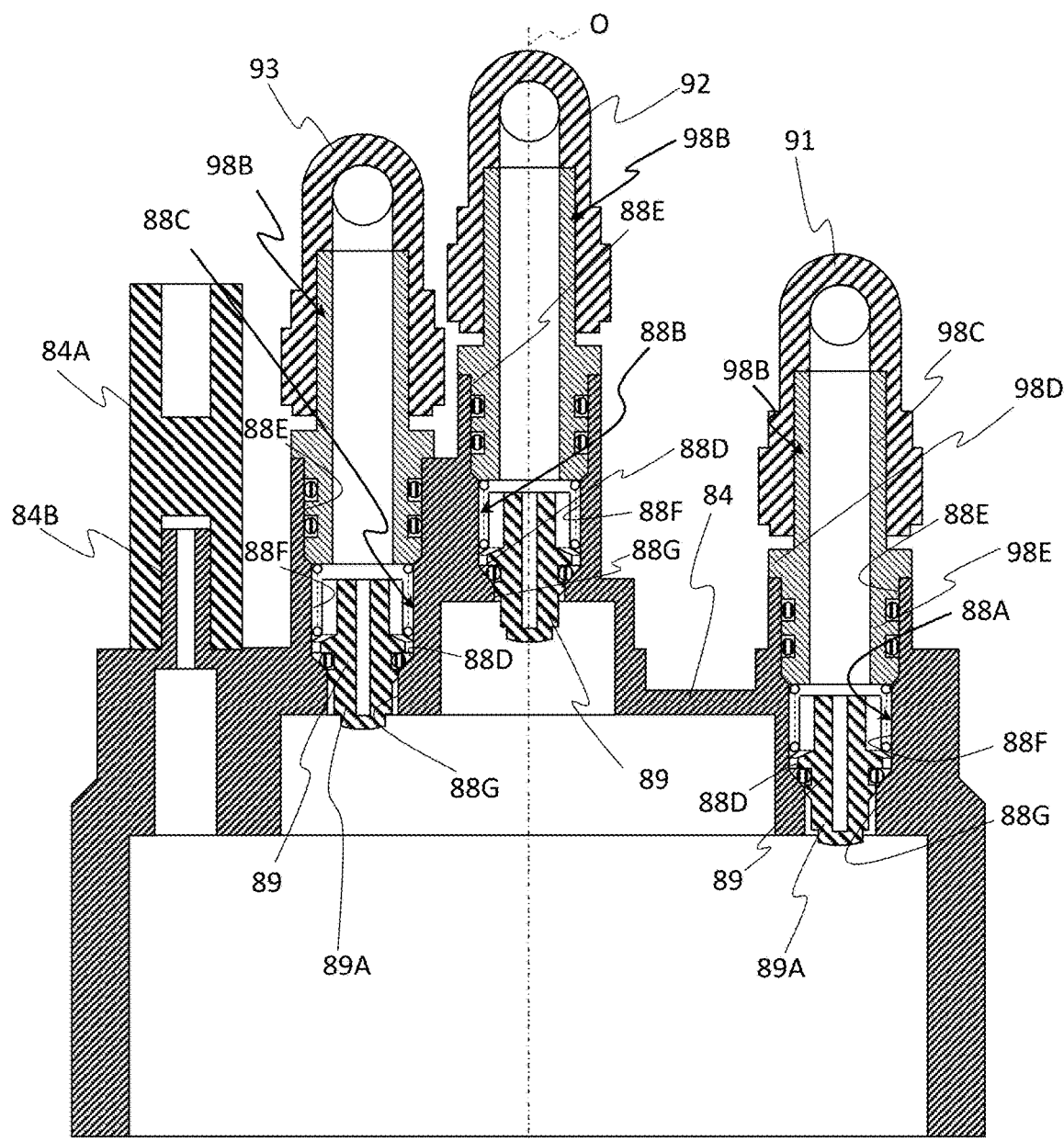
FIG. 14 is a longitudinal section of a socket before the replacement unit is attached thereto.

As illustrated in FIG. 14, the first hole portion 88A is formed so that the inner diameter thereof gradually decreases along a direction from an upper part toward a lower part thereof. The first hole portion 88A includes, in the direction from the upper part toward the lower part, a first cylindrical portion 88E, a second cylindrical portion 88F, and a third cylindrical portion 88G. An inner diameter of the first cylindrical portion 88E is larger than an inner diameter of the second cylindrical portion 88F and an inner diameter of the third cylindrical portion 88G. The inner diameter of the second cylindrical portion 88F is smaller than the inner diameter of the first cylindrical portion 88E and is larger than the inner diameter of the third cylindrical portion 88G. The inner diameter of the second cylindrical portion 88F is approximately equal to the inner diameter of the inflow port 86A of the cap 83. The inner diameter of the third cylindrical portion 88G is approximately equal to the inner diameter of the tip portion of the inflow port 86A.

A tapered surface having an inner diameter which narrows toward a second cylindrical portion 88F side along the axial direction is formed between the first cylindrical portion 88E and the second cylindrical portion 88F. A second tapered surface 88D having an inner diameter which narrows toward a third cylindrical portion 88G side along the axial direction is formed between the second cylindrical portion 88F and the third cylindrical portion 88G.

A joint 98B is inserted into the first cylindrical portion 88E of the first hole portion 88A. The joint 98B is a member that connects the first hole portion 88A and the first nozzle 91. The joint 98B has a tubular shape having a channel formed therein. The joint 98B has, in a direction from an upper side to a lower side along the axial direction, a first insertion portion 98C, a flange portion 98D, and a second insertion portion 98E.

An outer diameter of the second insertion portion 98E of the joint 98B is formed to be approximately equal to the inner diameter of the first cylindrical portion 88E of the first hole portion 88A. An inner diameter of the second insertion portion 98E is formed to be smaller than an outer diameter of a support portion 89F of the second valve member 89. By this means, the joint 98B functions as a stopper (second stopper) that defines a position of the second valve member 89.

A groove is formed over an entire region in a circumferential direction on an outer peripheral surface of the second insertion portion 98E. An O-ring is housed in the groove. In the illustrated example, two O-rings are arranged with an interval therebetween in the axial direction. The O-rings prevent a liquid from leaking out from between the second insertion portion 98E of the joint 98B and the first hole portion 88A.

An outer diameter of the flange portion 98D is a larger diameter than the outer diameter of the first insertion portion 98C and the second insertion portion 98E. The outer diameter of the flange portion 98D is approximately equal to the outer diameter of the first hole portion 88A.

The second insertion portion 98E of the joint 98B is inserted into the first cylindrical portion 88E of the first hole portion 88A. At such time, the flange portion 98D of the joint 98B contacts against an upper edge of the first hole portion 88A. By this means it is possible to prevent the joint 98B from being inserted excessively into the first hole portion 88A.

An outer diameter of the first insertion portion 98C of the joint 98B is approximately equal to the inner diameter of the first nozzle 91. The first insertion portion 98C of the joint 98B is inserted into the first nozzle 91.

The second hole portion 88B is formed so that an inner diameter thereof gradually decreases along a direction from an upper part toward a lower part thereof. The second hole portion 88B includes, in the direction from the upper part toward the lower part, a first cylindrical portion 88E, a second cylindrical portion 88F, and a third cylindrical portion 88G. An inner diameter of the second cylindrical portion 88F is approximately equal to the inner diameter of the first discharge port 86B of the cap 83. An inner diameter of the third cylindrical portion 88G is approximately equal to the inner diameter of the tip portion of the first discharge port 86B.

The joint 98B is inserted into the first cylindrical portion 88E of the second hole portion 88B. The joint 98B that is inserted into the first cylindrical portion 88E of the second hole portion 88B is a member that connects the second hole portion 88B and the second nozzle 92.

The O-ring housed in the groove on the outer peripheral surface of the second insertion portion 98E prevents a liquid from leaking out from between the second insertion portion 98E and the second hole portion 88B.

The third hole portion 88C is formed so that an inner diameter thereof gradually decreases along a direction from an upper part toward a lower part thereof. The third hole portion 88C includes, in the direction from the upper part toward the lower part, a first cylindrical portion 88E, a second cylindrical portion 88F, and a third cylindrical portion 88G. An inner diameter of the second cylindrical portion 88F is approximately equal to the inner diameter of the second discharge port 86C of the cap 83. An inner diameter of the third cylindrical portion 88G is approximately equal to the inner diameter of the tip portion of the second discharge port 86C.

The joint 98B is inserted into the first cylindrical portion 88E of the third hole portion 88C. The joint 98B that is inserted into the first cylindrical portion 88E of the third hole portion 88C is a member that connects the third hole portion 88C and the second nozzle 92.

The O-ring housed in the groove on the outer peripheral surface of the second insertion portion 98E prevents a liquid from leaking out from between the second insertion portion 98E and the third hole portion 88C.

(Structure Inside First Hole Portion 88A, Inside Second Hole Portion 88B, and Inside Third Hole Portion 88C)

As illustrated in FIG. 9, the socket 84 includes a second urging member 99B in the first hole portion 88A, the second hole portion 88B, and the third hole portion 88C (hereunder, referred to simply as "hole portions 88A to 88C"), respectively.

The second urging member 99B is a member that urges the second valve member 89. The second urging member 99B is, for example, a coiled spring. The second urging member 99B has an outer diameter which is slightly smaller than the inner diameter of the second cylindrical portion 88F of the hole portions 88A to 88C, and has an inner diameter which is larger than the inner diameter of the support portion 89F of the second valve member 89 and is smaller than the inner diameter of the spring receiving portion 89G. An urging force of the second urging member 99B is equal to the urging force of the first urging member 99A.

The second valve member 89 is arranged inside each of the hole portions 88A to 88C in a manner so that a first columnar portion 89A faces an opening direction of the hole portions 88A to 88C, and a support portion 89F faces a direction of the joint 98B. The second urging member 99B is arranged between the second valve member 89 and the joint 98B in the axial direction. The second urging member 99B is arranged in a manner so that the position of an upper end thereof is defined by the joint 98B, and a lower end thereof is in contact with the spring receiving portion 89G of the second valve member 89. That is, the joint 98B acts as a stopper (second stopper) that defines a position of the second urging member 99B.

The second urging member 99B urges the second valve member 89 downward. By this means, the first columnar portion 89A of the second valve member 89 is pushed into the third cylindrical portion 88G of the hole portions 88A to 88C, respectively.

When the second valve member 89 is urged downward by the second urging member 99B, the second columnar portion 87B of the second valve member 89, the O-ring mounted in the groove portion 87C, and the spring receiving portion 87G function as a valve element. At such time, the second tapered surface 88D of each of the hole portions 88A to 88C functions as a valve seat. Specifically, when the second valve member 89 is urged downward by the second urging member 99B, the second columnar portion 87B is inserted into the third cylindrical portion 88G of the hole portions 88A to 88C, respectively. When the second columnar portion 87B is further urged downward after being inserted into the third cylindrical portion 88G, the O-ring mounted in the groove portion 87C receives a reaction force from the second tapered surface 88D and is pushed into the spring receiving portion 87G. In this way, the second valve member 89 blocks a flow of a fluid through the hole portions 88A to 88C, respectively (see FIG. 14).

As illustrated in FIG. 9, when the socket 84 is attached to the cap 83, the first valve member 87 functioning as a valve element in the openings 86A to 86C in the cap 83, and the second valve member 89 functioning as a valve element in the hole portions 88A to 88C in the socket 84 face each other and press against each other in the axial direction. Thus, the first valve members 87 in the openings 86A to 86C enter an open state and the second valve members 89 in the hole portions 88A to 88C also enter an open state.

(Structure of Third Valve Member 84A)

The socket 84 includes a third valve member 84A. The third valve member 84A is mounted in an air hole 84B formed in the socket 84. The air hole 84B has a tubular shape that extends in the axial direction, and is arranged at an outer end portion in the radial direction in the top part of the socket 84.

The third valve member 84A occludes the air hole 84B. By removing the third valve member 84A from the air hole 84B, air can be easily introduced between the socket 84 and the cap 83. By this means, it is possible to easily separate the cap 83 and the socket 84 whose airtightness is secured by the plurality of O-rings.

<Operation for Replacing Reverse Osmosis Membrane 42>

Next, an operation for replacing the reverse osmosis membrane 42 in the membrane unit 80 will be described.

The replacement unit 80B is a replacement part that is itself an article that is traded, and is distributed on the market independently from the hand washing device 1.

Figure 11:
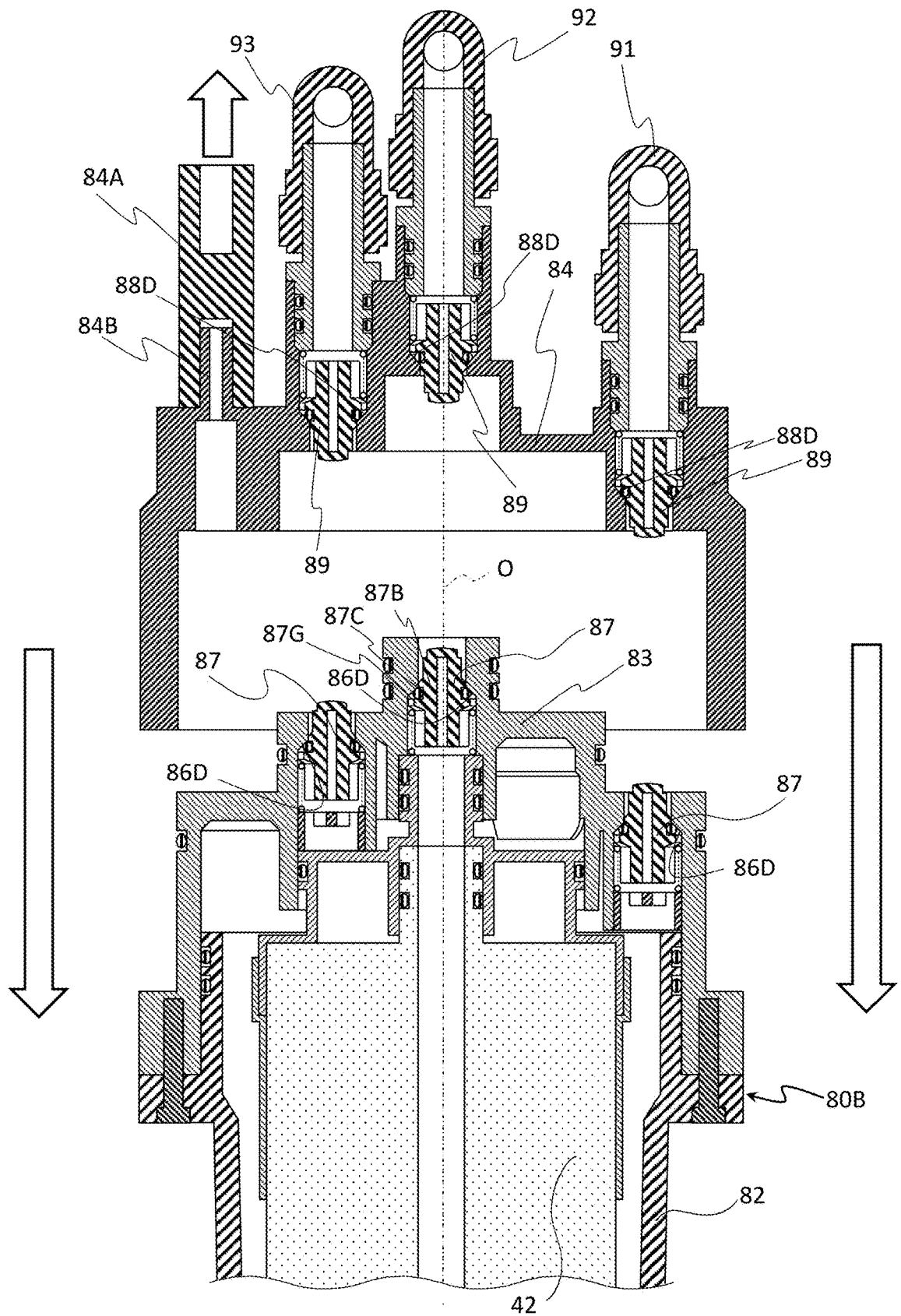
FIG. 11 is a view for describing an operation for detaching a replacement unit from a socket.

FIG. 11 is a view for describing an operation for detaching the replacement unit 80B from the socket 84.

As illustrated in FIG. 11, when replacing the reverse osmosis membrane 42, first, the replacement unit 80B is detached from the membrane unit 80. Specifically, first, the third valve member 84A is detached from the socket 84. Then, while introducing air between the cap 83 and the socket 84 through the air hole 84B, the replacement unit 80B is separated from the socket 84.

At such time, in the cap 83 of the replacement unit 80B, a pressing force in the downward direction which the first valve members 87 had been receiving from the second valve members 89 of the socket 84 is released.

Accompanying the release of the pressing force, each of the first valve members 87 is urged upward by the first urging member 99A, and the second columnar portion 87B of the first valve member 87, the O-ring mounted in the groove portion 87C, and the spring receiving portion 87G function as a valve element. At such time, the first tapered surface 86D in the inflow port 86A, the first discharge port 86B, and the second discharge port 86C, respectively, functions as a valve seat. Specifically, when the first valve member 87 is urged upward by the first urging member 99A, the second columnar portion 87B is inserted into the tip portion of the first discharge port 86B. When the second columnar portion 87B is further urged upward after being inserted into the first discharge port 86B, the O-ring mounted in the groove portion 87C receives a reaction force from the first tapered surface 86D and is pushed into the spring receiving portion 87G. In this way, the first valve members 87 block the flow of a fluid in the inflow port 86A, the first discharge port 86B, and the second discharge port 86C.

By this means, the cap 83 and the casing 82 are separated from the hand washing device 1 in a state in which the cap 83 has occluded the casing 82.

On the other hand, in the socket 84, the pressing force in the upward direction which the second valve members 89 have been receiving from the first valve members 87 of the cap 83 is released.

Accompanying the release of the pressing force, each of the second valve members 89 is urged downward by the second urging member 99B, and the second columnar portion 87B of the second valve member 89, the O-ring mounted in the groove portion 87C, and the spring receiving portion 87G function as a valve element. At such time, the second tapered surface 88D of each of the hole portions 88A to 88C functions as a valve seat. Specifically, when the second valve member 89 is urged upward by the second urging member 99B, the second columnar portion 87B is inserted into the first cylindrical portion 88E of the hole portions 88A to 88C, respectively. When the second columnar portion 87B is further urged upward after being inserted into the hole portions 88A to 88C, respectively, the O-ring mounted in the groove portion 87C receives a reaction force from the second tapered surface 88D and is pushed into the spring receiving portion 87G. In this way, the second valve members 89 block the flow of a fluid in the hole portions 88A to 88C.

The replacement unit 80B is collected, for example, by a trader in charge of maintenance of the hand washing device 1. The socket 84 is repeatedly used in a state in which the piping tubes of the hand washing device 1 and the nozzles 91 to 93 are connected.

The trader who collected the replacement unit 80B separates the casing 82 and the cap 83, and takes out the reverse osmosis membrane 42 that is housed therein.

Figure 12:
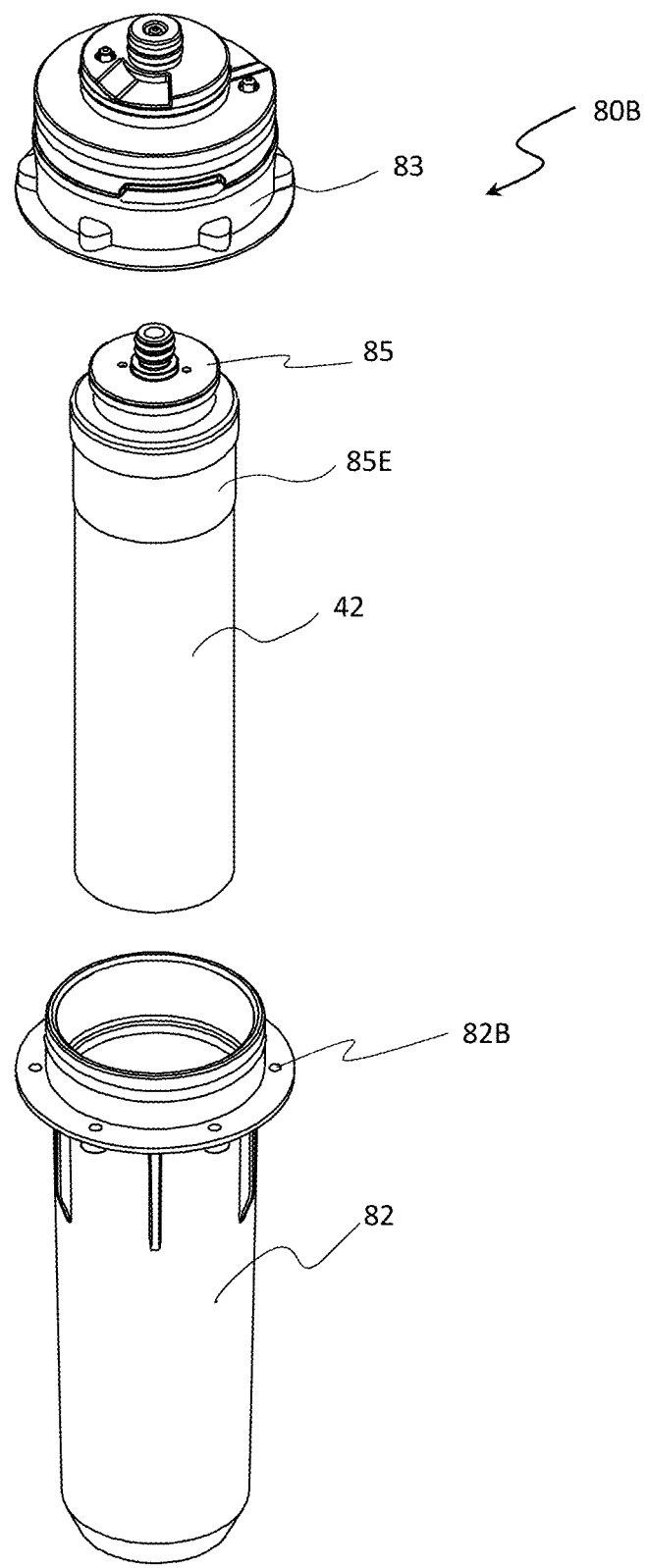
FIG. 12 is a view for describing an operation for replacing a reverse osmosis membrane in the replacement unit.

FIG. 12 is a view for describing the operation to replace the reverse osmosis membrane 42 in the replacement unit 80B.

As illustrated in FIG. 12, when replacing the reverse osmosis membrane 42, the casing 82 and the cap 83 are separated from each other. Specifically, the fastening screws 97 (see FIG. 9) are detached from the replacement unit 80B, and the cap 83 and the casing 82 are separated. In the state in which the cap 83 and the casing 82 have been separated, the positioning member 85 is fixed to the cap 83.

Next, the positioning member 85 having the reverse osmosis membrane 42 attached thereto is detached from the cap 83. The sleeve 85E is removed from the positioning member 85, and the deteriorated reverse osmosis membrane 42 is detached.

After detaching the deteriorated reverse osmosis membrane 42, the fixing portion 42B of a new reverse osmosis membrane 42 is fitted to the fixing cylindrical portion 85D of the positioning member 85. The sleeve 85E is mounted onto the positioning member 85 to which the reverse osmosis membrane 42 has been attached.

By fitting the small-diameter cylindrical portion 85C of the positioning member 85 to the fixing cylindrical portion 83G of the cap 83, and fitting the intermediate cylindrical portion 85B of the positioning member 85 to the fixing cylindrical portion 83F of the cap 83, the positioning member 85 to which the reverse osmosis membrane 42 is attached is fixed to the cap 83. By this means, a channel formed in the first discharge port 86B and a channel inside the reverse osmosis membrane 42 are connected in a straight line.

The cap 83 to which the positioning member 85 is fixed is covered with the casing 82 from below, and the casing 82 is fitted to the large-diameter cylindrical portion 83A of the cap 83. The flange 83D of the cap 83 is placed on the flange 82A of the casing 82 so that the screw holes 83E of the cap 83 and the through holes 82B of the casing 82 are connected in the axial direction. The fastening screws 97 are tightened into the screw holes 83E and the through holes 82B. By this means, the casing 82 and the cap 83 are fastened together.

When the casing 82 and the cap 83 are fastened together, in order to prevent the reverse osmosis membrane 42 from deteriorating due to drying, for example, water is injected from the inflow port 86A and stored inside the replacement unit 80B. Thus, a new replacement unit 80B is manufactured.

Figure 13:
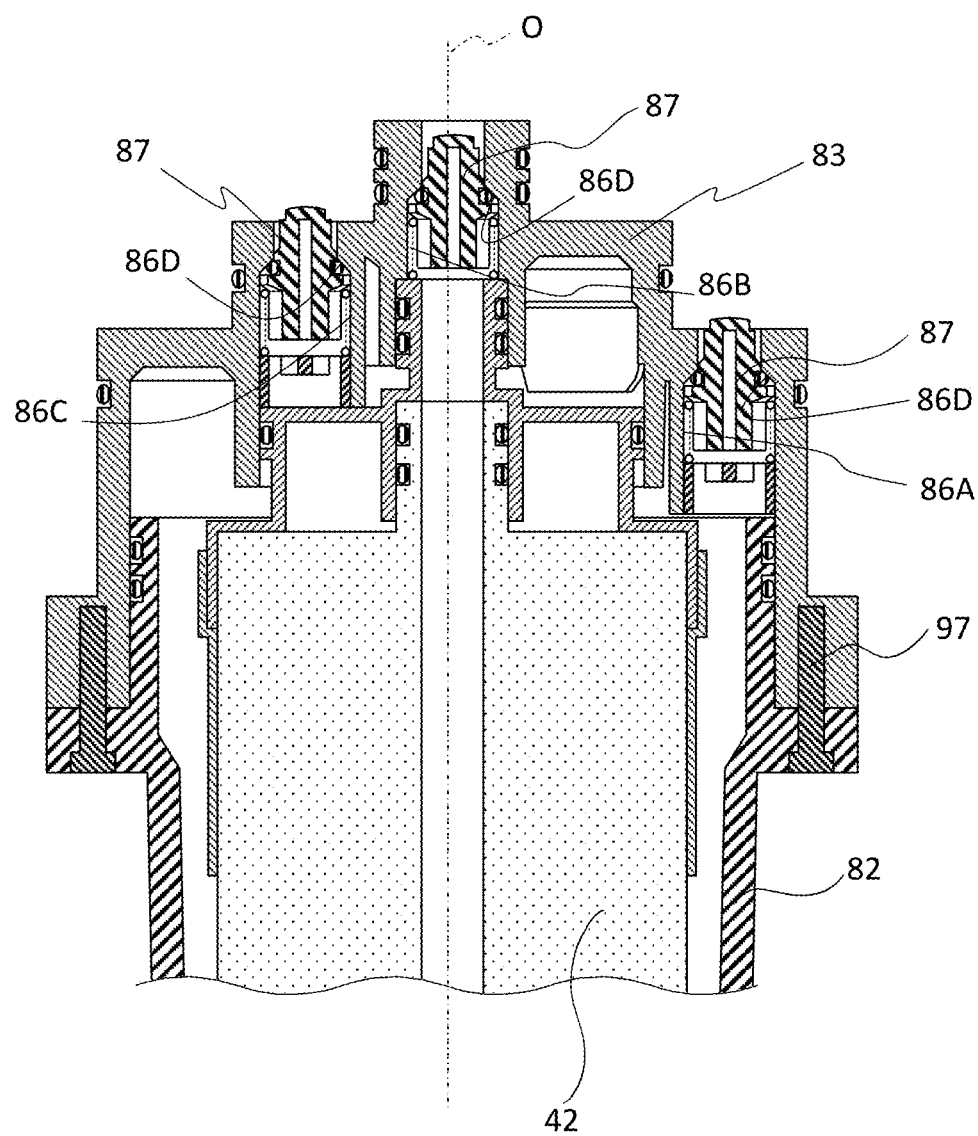
FIG. 13 is a longitudinal section of principal parts of the replacement unit.

FIG. 13 is a longitudinal section taken along principal parts of the replacement unit 80B.

As illustrated in FIG. 13, in the replacement unit 80B, the plurality of openings 86A to 86C are occluded by the first valve members 87. This is because, since the plurality of first valve members 87 are urged upward by the first urging members 99A, respectively, the second columnar portion 87B of each of the first valve member 87 and the O-ring mounted in the groove portion 87C are pressed against the respective first tapered surfaces 86D of the openings 86A to 86C, and thus the flow of a fluid is blocked. Therefore, during the process of transporting the replacement unit 80B, water stored inside the replacement unit 80B can be prevented from leaking out to outside of the replacement unit 80B through the openings 86A to 86C.

FIG. 14 is a longitudinal section of the socket 84 before the replacement unit 80B is attached thereto.

As illustrated in FIG. 14, in the state before the replacement unit 80B is attached, the hole portions 88A to 88C in the socket 84 are occluded by the second valve members 89. This is because, since the plurality of second valve members 89 are urged downward by the second urging members 99B, respectively, the second columnar portion 87B of each of the second valve member 89 and the O-ring mounted in the groove portion 87C are pressed against the respective second tapered surfaces 88D of the hole portions 88A to 88C, and thus the flow of a fluid is blocked. Therefore, in a state before the replacement unit 80B is mounted, fluids filling the first nozzle 91, the second nozzle 92, and the third nozzle 93 that are connected to the socket 84, as well as the piping tubes, can be prevented from flowing out to the outside of the socket 84 through the hole portions 88A to 88C.

Figure 15:
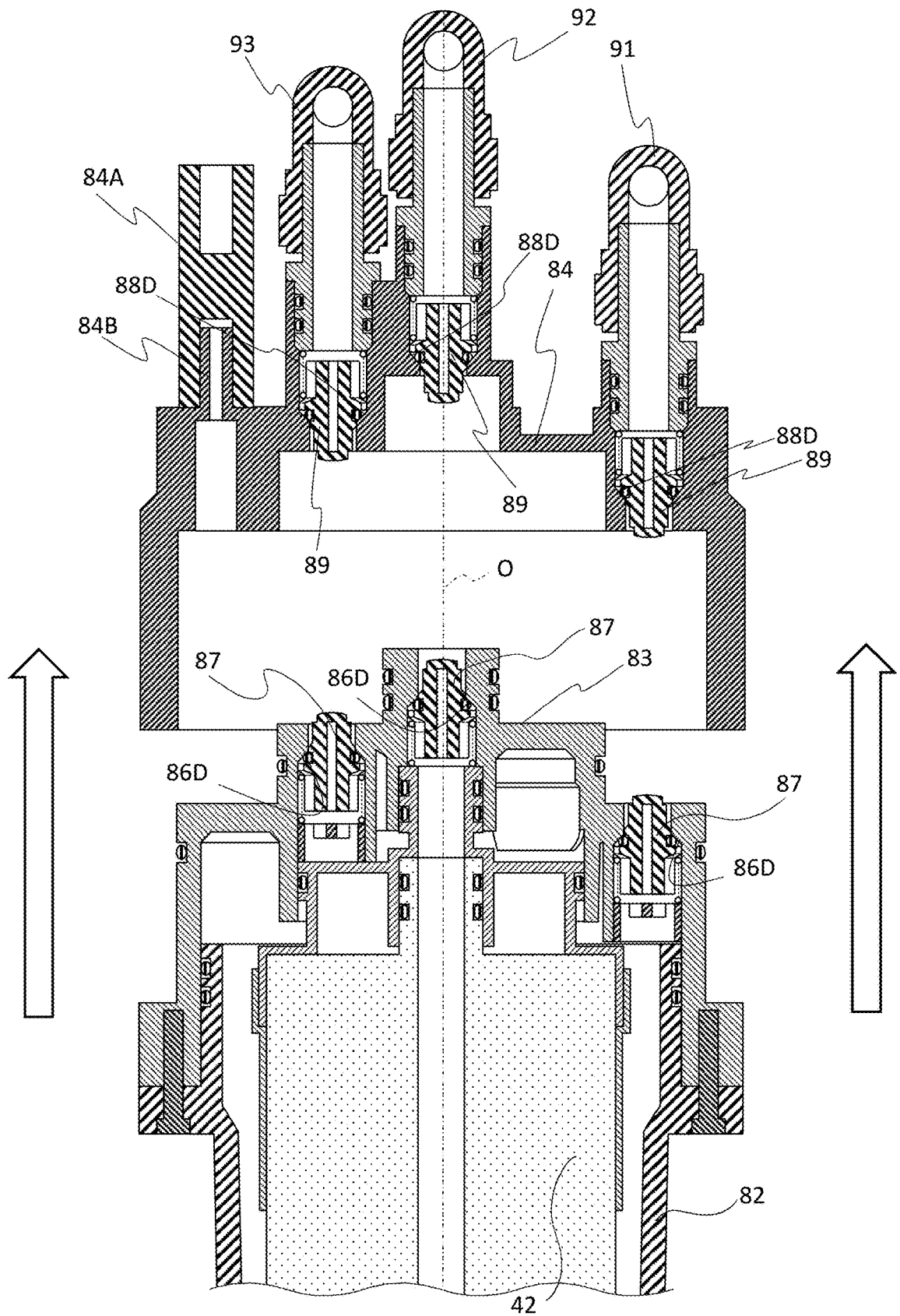
FIG. 15 is a view for describing an operation for attaching the replacement unit to the socket.

FIG. 15 is a view for describing an operation for attaching the replacement unit 80B to the socket 84.

As illustrated in FIG. 15, the replacement unit 80B is attached to the socket 84 in a manner so that the openings 86A to 86C of the cap 83 face the hole portions 88A to 88C of the socket 84, respectively, in the axial direction.

When the replacement unit 80B is mounted to the socket 84, the end portions of the first columnar portions 87A of the first valve members 87 protruding from the openings 86A and 86C, and the end portion of the first columnar portion 87A of the first valve member 87 arranged in the opening 86B come into contact with the end portions of the first columnar portions 87A of the second valve members 89 protruding from the hole portions 88A to 88C. As a result, the first valve members 87 are pressed downward in the axial direction and the second valve members 89 are pressed upward in the axial direction.

When the first valve members 87 are pressed downward by the second valve members 89, the first valve members 87 are displaced downward against the urging force received from the first urging members 99A. As a result, the second columnar portions 87B of the first valve members 87 separate from the first tapered surfaces 86D of the openings 86A to 86C together with the O-rings mounted in the groove portions 87C, thereby opening each of the plurality of openings 86A to 86C (see FIG. 9).

When the second valve members 89 are pressed upward by the first valve members 87, the second valve members 89 are displaced upward against the urging force received from the second urging members 99B. As a result, the second columnar portions 89B of the second valve members 89 separate from the second tapered surfaces 88D of the hole portions 88A to 88C together with the O-rings mounted in the groove portions 87C, thereby opening each of the hole portions 88A to 88C (see FIG. 9).

Thus, movement of a fluid between the socket 84 and the replacement unit 80B is enabled, and a state is entered in which the membrane unit 80 can be used.

The end portion of the first columnar portion 87A of the first valve member 87 and the end portion of the first columnar portion 89A of the second valve member 89 are each formed to have a tapered surface, and so that the outer diameter becomes narrower toward the end portion. By this means, when the replacement unit 80B is attached by being screwed into the socket 84, the first valve member 87 arranged in the inflow port 86A and the second valve member 89 arranged in the first hole portion 88A collide in a lateral direction, which generates an axial force at the first valve member 87 and the second valve member 89.

That is, when the replacement unit 80B is attached by being screwed into the socket 84, the first valve member 87 arranged in the second discharge port 86C and the second valve member 89 arranged in the third hole portion 88C collide in the lateral direction, which generates an axial force at the first valve member 87 and the second valve member 89. Therefore, even when the replacement unit 80B is attached by being screwed into the socket 84, it is possible to smoothly attach the replacement unit 80B to the socket 84.

<Flow of Water Inside Membrane Unit 80>

Figure 16:
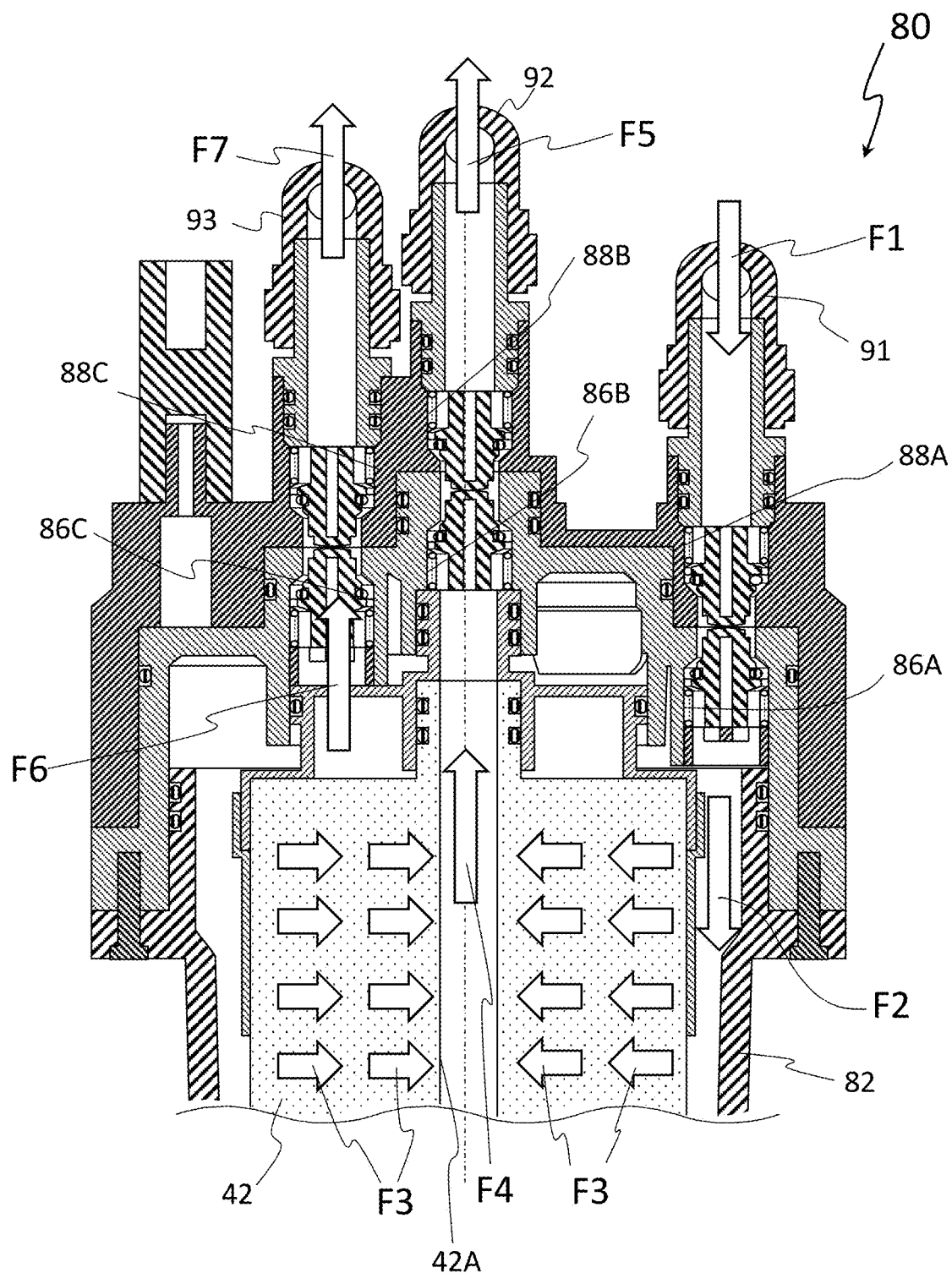
FIG. 16 is a view for describing a flow of water in the membrane unit.

Next, a flow of water in the membrane unit 80 will be described. FIG. 16 is a view for describing the flow of water in the membrane unit 80.

As illustrated in FIG. 16, water (F1) supplied at high pressure from the membrane filtration pump 47 flows from the first nozzle 91 into the casing 82 through the first hole portion 88A and the inflow port 86A (F2).

The water inside the casing 82 permeates the reverse osmosis membrane 42 due to the pressure of the water that flows in from the inflow port 86A and the osmotic pressure (F3).

Permeated water which has permeated the reverse osmosis membrane 42 flows upward through the pipe 42A arranged in the center in the radial direction of the reverse osmosis membrane 42 (F4).

The permeated water flowing down the pipe 42A is discharged to the outside of the membrane unit 80 from the second nozzle 92 through the first discharge port 86B and the second hole portion 88B, and flows down to the water storage tank 46 (F5).

One part of the water in the casing 82 becomes permeated water and is concentrated, and the rest of the water becomes concentrated water (F6).

The concentrated water is discharged to the outside of the membrane unit 80 from the third nozzle 93 through the second discharge port 86C and the third hole portion 88C, and flows down to the drainage tank 45 or the intermediate tank 44 (F7).

In this way, the water supplied to the membrane unit 80 from the membrane filtration pump 47 is separated into permeated water and concentrated water.

<Control Processing of Hand Washing Device 1>

Next, control processing of the hand washing device 1 will be described. FIG. 17 is explanatory diagrams illustrating control processing of the hand washing device 1.

(Spouting Process of Spout Unit 20)

First, a process for spouting water from the faucet 12 that is carried out by the spout unit 20 will be described.

Figure 17A:
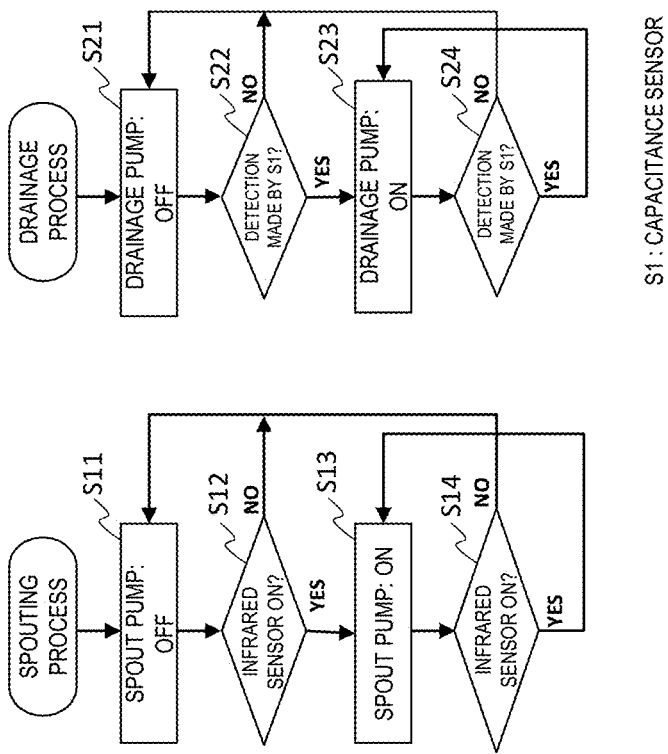
FIG. 17A is an explanatory drawing illustrating control processing of a circulation unit.

As illustrated in FIG. 17A, the controller 60 turns the spout pump 21 off (step S11).

The controller 60 determines whether or not an object has been detected by the infrared sensor 23 (step S12). When a user utilizes the hand washing device 1, the user puts their hand into the wash-hand basin 11 and causes the infrared sensor 23 arranged at the tip portion of the faucet 12 to detect one or more fingers.

In response to the detection of a finger by the infrared sensor 23 (Yes in step S12), the controller 60 actuates the spout pump 21 (step S13).

The spout pump 21 causes water stored in the water storage tank 46 to pass through the UV sterilization section 22. The UV sterilization section 22 irradiates ultraviolet rays at the water sent from the spout pump 21, to thereby subject the water to a sterilization treatment. The water that passes through the UV sterilization section 22 is spouted from the spout 13 of the faucet 12 as washing water.

On the other hand, in step S12, if a finger is not detected by the infrared sensor 23 (No in step S12), the spout pump 21 does not operate (step S11).

The controller 60 determines whether or not an object is detected by the infrared sensor 23 (step S14). When the user finishes utilizing the hand washing device 1, or when the user causes the dispenser 14 to dispense a pharmaceutical agent, the user moves their fingers away from the infrared sensor 23 arranged at the tip portion of the faucet 12.

In response to the non-detection of a finger by the infrared sensor 23 (No in step S14), the controller 60 stops the spout pump 21 (step S11).

On the other hand, in step S14, if non-detection of a finger by the infrared sensor 23 does not occur (Yes in step S14), the controller 60 continues to operate the spout pump 21 (step S13).

The spout unit 20 repeats these processes and spouts washing water from the faucet 12.

The controller 60 may be configured to measure a time period for which a finger is detected by the infrared sensor 23, and to stop water being spouted from the faucet 12 if a finger has been detected for a certain period of time.

(Drainage Process of Drainage Unit 30)

Next, a drainage process performed by the drainage unit 30 will be described.

Figure 17B:
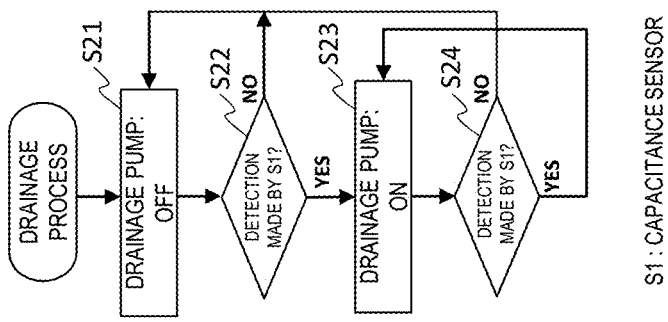
FIG. 17B is an explanatory drawing illustrating control processing of the circulation unit.

As illustrated in FIG. 17B, in a state in which no water is being drained from the wash-hand basin 11, the drainage pump 32 is stopped (step S21).

Subsequently, upon washing water spouted from the faucet 12 toward the wash-hand basin 11 being drained from the drainage outlet 17 of the wash-hand basin 11, the capacitance sensor 31 detects the drained water (step S22).

When the capacitance sensor 31 detects the drained water (Yes in step S22), the controller 60 actuates the drainage pump 32 (step S23).

On the other hand, if the capacitance sensor 31 does not detect drained water (No in step S22), the controller 60 does not actuate the drainage pump 32 (step S21).

In step S23 the drainage pump 32 sends the drained water to the pretreatment filter 41. Water subjected to a pretreatment by the pretreatment filter 41 flows into the intermediate tank 44 and is stored in the intermediate tank 44. The pressure sensor 33 detects the pressure of the water sent to the pretreatment filter 41. The flow rate sensor 34 detects the flow rate of the water subjected to the pretreatment by the pretreatment filter 41.

Subsequently, after step S23, if the capacitance sensor 31 detects that drained water has stopped flowing in from the drainage outlet 17 (No in step S24), the controller 60 stops the drainage pump 32 (step S21).

On the other hand, in step S24, if the capacitance sensor 31 detects that drained water continues to flow in from the drainage outlet 17 (Yes in step S24), the controller 60 continues to operate the drainage pump 32 (step S23).

The drainage unit 30 repeats these processes to supply water that is drained from the drainage outlet 17 of the wash-hand basin 11 to the pretreatment filter 41.

(Control Process of Purification Unit 40)

Next, a purification process performed by the purification unit 40 will be described.

Figure 17C:
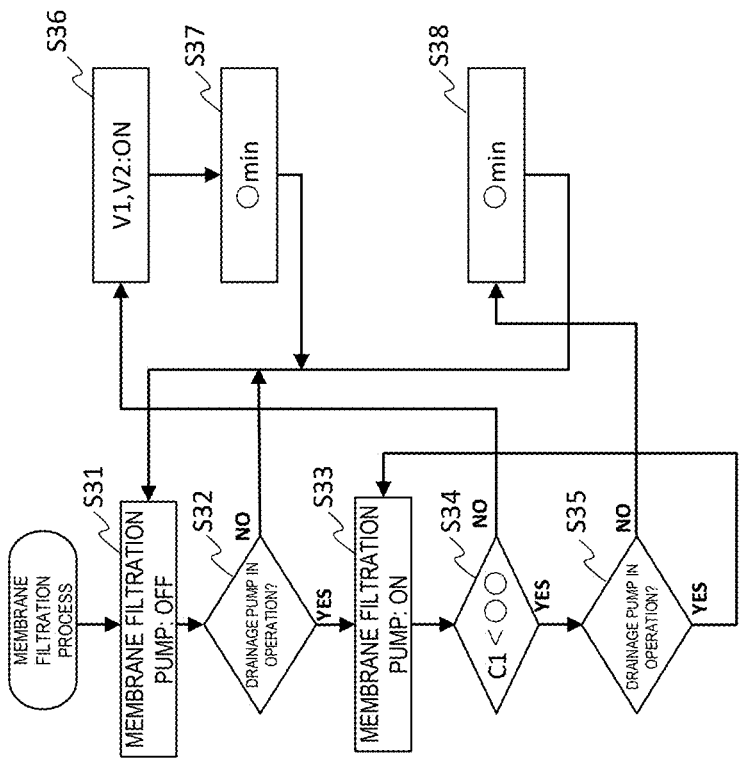
FIG. 17C is an explanatory drawing illustrating control processing of the circulation unit.

As illustrated in FIG. 17C, initially, the membrane filtration pump 47 is stopped (step S31).

The controller 60 determines whether or not the drainage pump 32 is being operated (step S32).

If the drainage pump 32 is operating (Yes in step S32), the controller 60 actuates the membrane filtration pump 47 (step S33). By this means, water stored in the intermediate tank 44 is supplied at high pressure to the reverse osmosis membrane 42 by the membrane filtration pump 47.

On the other hand, if the drainage pump 32 is not operating (No in step S32), the controller 60 maintains a state in which the membrane filtration pump 47 is not actuated (step S31).

In step S33, the water supplied to the reverse osmosis membrane 42 is separated into concentrated water and permeated water by the reverse osmosis membrane 42. The permeated water is supplied to the post-treatment filter 43.

The concentrated water flows into the intermediate tank 44 via the two-way solenoid valve 74. Note that, because the two-way solenoid valve 75 is in a closed state, a situation does not occur in which the concentrated water flows into the drainage tank 45.

At the post-treatment filter 43, the permeated water is subjected to a post-treatment. Then, hypochlorous acid water is added to the permeated water subjected to the post-treatment by the post-treatment filter 43, and the permeated water to which the hypochlorous acid water has been added flows into the water storage tank 46.

After step S33, the controller 60 determines whether or not the electric conductivity detected by the EC/temperature sensor of the sensor section 61 arranged at a preceding stage to the reverse osmosis membrane 42 is less than a predetermined value (step S34).

If the electric conductivity detected by the EC/temperature sensor is less than the predetermined value (Yes in S34), the controller 60 determines whether or not the drainage pump 32 is operating (step S35). If the drainage pump 32 is operating (Yes in step S35), the controller 60 continues to operate the membrane filtration pump 47 (step S33).

On the other hand, in step S34, if the electric conductivity detected by the EC/temperature sensor is equal to or greater than the predetermined value (No in step S34), the controller 60 turns the two-way solenoid valve 74 and the two-way solenoid valve 75 on (step S36). As a result, the two-way solenoid valve 74 is closed, and the two-way solenoid valve 75 is opened.

By the two-way solenoid valve 74 being closed and the two-way solenoid valve 75 being opened, the concentrated water separated by the reverse osmosis membrane 42 flows into the drainage tank 45 via the two-way solenoid valve 75. That is, the controller 60 determines an amount of impurities in the concentrated water based on a change in electrical conductivity detected by the EC/temperature sensor. Concentrated water that is determined as containing a large amount of impurities is discharged to the drainage tank 45.

When the water level of the concentrated water stored in the drainage tank 45 reaches a predetermined value, for example, an alert is issued to a manager of the hand washing device 1. When the manager confirms the alert, the water stored in the drainage tank 45 is discarded.

The controller 60 continues the process in step S36 for a predetermined period of time (step S37), and after the predetermined period of time has elapsed, the controller 60 turns the two-way solenoid valves 74 and 75 off. As a result, the two-way solenoid valve 74 is opened and the two-way solenoid valve 75 is closed.

Thus, by the two-way solenoid valve 74 being opened and the two-way solenoid valve 75 being closed, concentrated water separated by the reverse osmosis membrane 42 flows into the intermediate tank 44 via the two-way solenoid valve 74. The controller 60 then stops the membrane filtration pump 47 (step S31).

In step S35, if the drainage pump 32 is stopped (No in step S35), after a predetermined period of time has elapsed (step S38), the controller 60 stops the membrane filtration pump 47 (step S31).

The purification unit 40 repeats these processes to thereby purify water drained by the drainage unit 30 and store the purified water in the water storage tank 46.

As described above, according to the membrane unit 80 of the present embodiment, since the casing 82 in which the reverse osmosis membrane 42 is housed and the cap 83 that occludes the casing 82 are detachably attachable to each other, the cap 83 can be detached from the casing 82 and the reverse osmosis membrane 42 can be replaced. Thus, when the reverse osmosis membrane 42 has deteriorated, it is not necessary to replace the reverse osmosis membrane 42 together with the casing 82, and it suffices to replace only the reverse osmosis membrane 42. Hence, the membrane unit 80 in which the casing 82 is reusable can be provided. Hence, it is possible to avoid wasting resources.

In addition, the membrane unit 80 includes the positioning member 85 which is fixed to the cap 83 and which defines the position of the reverse osmosis membrane 42 inside the casing 82. Therefore, the reverse osmosis membrane 42 which is required to be accurately positioned inside the casing 82 can be prevented from being displaced inside the casing 82 due to membrane filtration which is performed under high pressure. By this means, a decrease in filtration performance due to displacement of the reverse osmosis membrane 42 can be prevented.

Further, in the cap 83, the first valve members 87 are mounted in the inflow port 86A, the first discharge port 86B, and the second discharge port 86C, respectively. Therefore, water that is stored inside the replacement unit 80B to which the cap 83 is attached can be prevented from leaking out to outside.

Further, in the cap 83, the first distance between the first discharge port 86B and the inflow port 86A, and the second distance between the first discharge port 86B and the second discharge port 86C are different to each other. It can thus be made difficult for a mistake to be made relating to the places at which the first nozzle 91 to the third nozzle 93 are connected when connecting the membrane unit 80 to the first nozzle 91 to the third nozzle 93 which are to be connected to the plurality of openings 86A to 86C.

Further, the position of the inflow port 86A in the radial direction in the cap 83 is outside of the outer peripheral surface of the positioning member 85. Therefore, water that flows into the casing 82 at high pressure from the inflow port 86A can smoothly flow into the casing 82 without being blocked by the positioning member 85.

In addition, the position of the second discharge port 86C in the radial direction is a position that overlaps in the axial direction with the positioning member 85. Therefore, the cap 83 in which the plurality of openings 86A to 86C are formed can be made compact in the radial direction.

Further, the membrane unit 80 includes the socket 84 that is attached to the cap 83 and which causes the respective first valve members 87 to open. Therefore, the first valve members 87 in the cap 83 can be opened by merely attaching the replacement unit 80B to the socket 84, and hence the work for attaching the replacement unit 80B can be easily performed.

Further, the hole portions 88A to 88C that connect to the inflow port 86A, the first discharge port 86B, and the second discharge port 86C, respectively, are formed in the socket 84, and the second valve member 89 is mounted in the plurality of hole portions 88A to 88C, respectively.

Therefore, in a state in which the replacement unit 80B is not attached to the socket 84, water can be prevented from leaking out to the outside through the socket 84 from the piping tubes connected to the socket 84.

Further, the inflow port 86A, the first discharge port 86B, and the second discharge port 86C are respectively opened as a result of the first valve members 87 and the second valve members 89 pressing against each other in the axial direction. Therefore, by merely performing the operation of attaching the replacement unit 80B to the socket 84, the hole portions 88A to 88C of the socket 84 and the openings 86A to 86C of the cap 83 can be simultaneously opened, and thus excellent workability can be ensured.

In addition, the socket 84 includes the third valve member 84A attached thereto, which makes it possible to separate the cap 83 from the socket 84 by introducing air between the socket 84 and the cap 83. Therefore, in the membrane unit 80 whose interior is under high pressure, the socket 84 and the cap 83 can be separated by a simple operation even in a state where high airtightness is maintained between the cap 83 and the socket 84.

Further, the cap 83 includes the stoppers 98A and the first urging members 99A. Therefore, deviations in the positions of the first valve members 87 can be prevented by the stoppers 98A while the O-rings mounted in the second columnar portion 87B and the groove portion 87C of the first valve members 87 are appropriately pressed against the first tapered surface 86D of the inflow port 86A and the second discharge port 86C by the first urging members 99A.

Further, in the cap 83, the slits 86E are formed on the outer side in the radial direction of the inflow port 86A and the second discharge port 86C. When press-fitting the stoppers 98A into the inflow port 86A and the second discharge port 86C, the slits 86E cause the diameters of the respective openings 86A to 86C to expand outward in the radial direction. Therefore, the stoppers 98A can be firmly fixed in the inflow port 86A and the second discharge port 86C by interference fitting.

In addition, the socket 84 includes the joints 98B as second stoppers and the second urging members 99B. Therefore, a deviation in the position of the second valve members 89 can be prevented by the joints 98B while the O-rings mounted in the second columnar portions 89B and the groove portions 89C of the second valve members 89 are appropriately pressed against the second tapered surfaces 88D of the hole portions 88A to 88C by the second urging members 99B.

Further, since the hand washing device 1 includes the membrane unit 80, it is possible to repeatedly use the casing 82 and the cap 83 of the replacement unit 80B when replacing the reverse osmosis membrane 42, and thus a hand washing device that has a low environmental load can be provided.

<Modifications>

Note that, in order to restrict use of a low-quality interchangeable product for the membrane unit 80, a connection restriction for the replacement unit 80B can be provided in the membrane unit 80.

For example, verification by short-range radio communication may be mentioned as one kind of electronic connection restriction. Specifically, an electronic tag such as an RFID is mounted on the replacement unit 80B, and a reader is mounted on the hand washing device 1. Then, a restriction may be provided whereby the controller 60 operates normally only when verification by the short-range radio communication using the reader and the electronic tag was appropriately performed when attaching the replacement unit 80B to the socket 84.

Further, verification by means of a two-dimensional code as typified by a QR code (registered trademark) is another kind of electronic connection restriction. Specifically, a two-dimensional code is mounted on the replacement unit 80B, and a reader is mounted on the hand washing device. Then, a restriction may be provided whereby the controller 60 operates normally only in a case where, when attaching the replacement unit 80B to the socket 84, the reader is caused to read the two-dimensional code and verification is appropriately performed. Alternatively, a worker who is performing the work to replace the membrane unit 80 may perform the verification by reading the two-dimensional code using a portable terminal device and then sending the information from the terminal device to the hand washing device.

In addition, as another kind of connection restriction, verification may be performed after evaluating a filtration quality of the reverse osmosis membrane 42 of the membrane unit 80. In this case, a restriction may be provided whereby the electrical conductivity detected by the sensor section 62 located on the downstream side of the membrane unit 80 is evaluated, and if the membrane unit 80 does not meet a certain standard, it is determined that the membrane unit 80 is an inferior product with low filtration quality, and the operation of the controller 60 is stopped.

Although a preferred embodiment of the present disclosure has been described above, the present disclosure is not limited to such a specific embodiment, and the present disclosure encompasses the invention described in the claims as well as equivalents thereof. In addition, some of the configurations of the devices described in the above embodiment and the modifications thereof can be omitted as long as no technical contradiction arises.

The matters described in the above embodiment will be added below.

APPENDIX 1

A membrane unit 80, including: a cross-flow membrane filter 42, a cylindrical casing 82 that houses the membrane filter 42,
a cap 83 provided with: an inflow port 86A that allows water to flow into the casing 82; a first discharge port 86B that discharges, to outside of the casing 82, permeated water obtained as a result of water that flows into the casing 82 from the inflow port 86A permeating the membrane filter 42; and a second discharge port 86C that discharges, to the outside of the casing 82, concentrated water obtained as a result of water being concentrated as a result of the permeated water permeating the membrane filter 42, the cap 83 detachably occluding the casing 82, and a positioning member 85 which is fixed to the cap 83 taking the first discharge port 86B as a reference, and which defines a position of the membrane filter 42 inside the casing 82.

APPENDIX 2

The membrane unit 80 according to (APPENDIX 1), wherein a first distance between the first discharge port 86B and the inflow port 86A, and a second distance between the first discharge port 86B and the second discharge port 86C are different.

APPENDIX 3

The membrane unit 80 according to (APPENDIX 2), wherein the first distance is longer than the second distance.

APPENDIX 4

The membrane unit 80 according to (APPENDIX 3), wherein: the positioning member 85 has a cylindrical shape which is fixed coaxially with the first discharge port 86B, and the inflow port 86A is formed outside of an outer peripheral surface of the positioning member 85.

APPENDIX 5

The membrane unit 80 according to any one of (APPENDIX 1) to (APPENDIX 4), wherein, in the cap 83, a first valve member 87 is arranged in the inflow port 86A, the first discharge port 86B, and the second discharge port 86C, respectively.

APPENDIX 6

The membrane unit 80 according to (APPENDIX 5), wherein the cap 83 includes:
first stoppers 98A that prevent entry of the first valve members 87 into the casing 82, and
first urging members 99A which are arranged between the first valve members 87 and the first stoppers 98A, respectively, and which place the first valve members 87 in a closed state by being supported by the first stoppers 98A and urging the first valve members 87 in an outward direction of the casing 82.

APPENDIX 7

The membrane unit 80 according to (APPENDIX 6), wherein the cap 83 has slits 86E that, by press-fitting of the first stoppers 98A, expand a diameter of the inflow port 86A, the first discharge port 86B, and the second discharge port 86C.

APPENDIX 8

The membrane unit 80 according to any one of (APPENDIX 1) to (APPENDIX 7), wherein: in the cap 83, the first valve member 87 is arranged in the inflow port 86A, the first discharge port 86B, and the second discharge port 86C, respectively, and the membrane unit 80 includes a socket 84 that is attached to the cap 83 and causes the first valve members 87 to open, respectively.

APPENDIX 9

The membrane unit 80 according to (APPENDIX 8), wherein: the first valve member 87 enters an open state upon receiving a force in an inward direction of the casing 82, the socket 84 has hole portions 88A to 88C at positions that correspond to the inflow port 86A, the first discharge port 86B, and the second discharge port 86C, respectively, when the socket 84 is attached to the cap 83, second valve members 89 that enter an open state upon receiving a force in an outward direction of the casing 82 are arranged in the hole portions 88A to 88C, and when the socket 84 and the cap 83 are attached, the first valve members 87 face the second valve members 89, and the first valve members 87 are pressed in an inward direction of the casing 82 by the second valve members 89, and the second valve members 89 are pressed in an outward direction of the casing 82 by the first valve members 87, causing the first valve members 87 and the second valve members 89 to enter an open state.

APPENDIX 10

The membrane unit 80 according to (APPENDIX 9), wherein the socket 84 includes: second stoppers 98B that prevent entry of the second valve members 89 into a connection destination, and second urging members 99B which are arranged between the second valve members 89 and the second stoppers 98B, and which place the second valve members 89 in a closed state by being supported by the second stoppers 98B and urging the second valve members 89 in the inward direction of the casing 82.

APPENDIX 11

The membrane unit 80 according to any one of (APPENDIX 8) to (APPENDIX 10), wherein the socket 84 has a third valve member 84A which, when in an open state, introduces air between the socket 84 and the cap 83.

APPENDIX 12

A hand washing device 1, including: a first casing 2, a wash-hand basin 11 that is provided in one part of the first casing 2, a faucet 12 having a spout that spouts washing water, and a circulation unit (a circulation mechanism) 6 which has at least one part provided inside the first casing 2, and which purifies drained water from the wash-hand basin 11 and circulates the water that is purified as the washing water, wherein: the circulation unit includes a membrane unit 80, and the membrane unit 80 includes: a cross-flow membrane filter 42, a cylindrical second casing 82 that houses the membrane filter 42, a cap 83 provided with: an inflow port 86A that allows the drained water to flow into the second casing 82; a first discharge port 86B that discharges, to the circulation unit, permeated water obtained as a result of drained water that flows in from the inflow port 86A permeating the membrane filter 42; and a second discharge port 86C that discharges, to the circulation unit, concentrated water obtained as a result of the drained water being concentrated as a result of the permeated water permeating the membrane filter 42, the cap 83 detachably occluding the second casing 82, and a positioning member 85 which is fixed to the cap 83 taking the first discharge port 86B as a reference, and which defines a position of the membrane filter 42 inside the second casing 82.

The invention claimed is:

1. A membrane unit comprising:
   a cross-flow membrane filter,
   a cylindrical casing that houses the membrane filter,
   a cap that detachably occludes the casing, the cap being provided with:
      an inflow port that allows water to flow into the casing;
      a first discharge port that discharges, to outside of the casing, permeated water obtained as a result of water that flows into the casing from the inflow port permeating the membrane filter;
      a second discharge port that discharges, to the outside of the casing, concentrated water obtained as a result of water being concentrated as a result of the permeated water permeating the membrane filter;
      a first valve member arranged in the inflow port, the first discharge port, and the second discharge port, respectively;
      first stoppers that prevent entry of the first valve members into the casing; and
      first urging members which are arranged between the first valve members and the first stoppers, respectively, and which place the first valve members in a closed state by being supported by the first stoppers and urging the first valve members in an outward direction of the casing; and
   a positioning member which is fixed to the cap taking the first discharge port as a reference, and which defines a position of the membrane filter inside the casing.

2. The membrane unit according to claim 1, wherein:
   a first distance between the first discharge port and the inflow port, and a second distance between the first discharge port and the second discharge port are different.

3. The membrane unit according to claim 2, wherein:
   the first distance is longer than the second distance.

4. The membrane unit according to claim 3, wherein:
   the positioning member has a cylindrical shape which is fixed coaxially with the first discharge port, and the inflow port is formed outside of an outer peripheral surface of the positioning member.

5. The membrane unit according to claim 1, wherein:
   the cap has slits that, by press-fitting of the first stoppers, expand a diameter of the inflow port, the first discharge port, and the second discharge port.

6. A membrane unit comprising:
   a cross-flow membrane filter,
   a cylindrical casing that houses the membrane filter,
   a cap that detachably occludes the casing, the cap being provided with:
      an inflow port that allows water to flow into the casing;
      a first discharge port that discharges, to outside of the casing, permeated water obtained as a result of water that flows into the casing from the inflow port permeating the membrane filter; and
      a second discharge port that discharges, to the outside of the casing, concentrated water obtained as a result of water being concentrated as a result of the permeated water permeating the membrane filter, and
   a positioning member which is fixed to the cap taking the first discharge port as a reference, and which defines a position of the membrane filter inside the casing;
   wherein:
   in the cap, a first valve member is arranged in the inflow port, the first discharge port, and the second discharge port, respectively; and
   a socket is attached to the cap and causes the first valve members to open, respectively.

7. The membrane unit according to claim 6, wherein:
   the first valve member enters an open state upon receiving a force in an inward direction of the casing,
   the socket has hole portions at positions that correspond to the inflow port, the first discharge port, and the second discharge port, respectively, when the socket is attached to the cap,
   second valve members that enter an open state upon receiving a force in an outward direction of the casing are arranged in the hole portions, and
   when the socket and the cap are attached, the first valve members face the second valve members, and the first valve members are pressed in an inward direction of the casing by the second valve members, and the second valve members are pressed in an outward direction of the casing by the first valve members, which causes the first valve members and the second valve members to enter an open state.

8. The membrane unit according to claim 7, wherein the socket comprises:
   second stoppers that prevent entry of the second valve members into a connection destination, and
   second urging members which are arranged between the second valve members and the second stoppers, and which place the second valve members in a closed state by being supported by the second stoppers and urging the second valve members in the inward direction of the casing.

9. The membrane unit according to claim 6, wherein:
   the socket has a third valve member which, when in an open state, introduces air between the socket and the cap.

10. A hand washing device comprising:
    a first casing,
    a wash-hand basin provided in one part of the first casing,
    a faucet having a spout that spouts washing water, and
    a circulation mechanism which has at least one part provided inside the first casing, and which purifies drained water from the wash-hand basin and circulates the water that is purified as the washing water,
    wherein:
    the circulation mechanism comprises a membrane unit, and
    the membrane unit comprises:
       a cross-flow membrane filter,
       a cylindrical second casing that houses the membrane filter,
       a cap provided with: an inflow port that allows the drained water to flow into the second casing; a first discharge port that discharges, to the circulation mechanism, permeated water obtained as a result of drained water that flows in from the inflow port permeating the membrane filter; and a second discharge port that discharges, to the circulation mechanism, concentrated water obtained as a result of the drained water being concentrated as a result of the permeated water permeating the membrane filter, the cap detachably occluding the second casing, and a positioning member which is fixed to the cap taking the first discharge port as a reference, and which defines a position of the membrane filter inside the second casing, wherein, in the cap, a first valve member is arranged in the inflow port, the first discharge port, and the second discharge port, respectively, and wherein a socket is attached to the cap and causes the first valve members to open, respectively.

* * * * *